(12) United States Patent
Burckhardt et al.

(10) Patent No.: US 11,214,706 B2
(45) Date of Patent: * Jan. 4, 2022

(54) POLYURETHANE COMPOSITION WITH LOW PLASTICISER MIGRATION

(71) Applicant: SIKA TECHNOLOGY AG, Baar (CH)

(72) Inventors: Urs Burckhardt, Zürich (CH); Andreas Kramer, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 448 days.

This patent is subject to a terminal disclaimer.

(21) Appl. No.: 15/777,484

(22) PCT Filed: Dec. 20, 2016

(86) PCT No.: PCT/EP2016/081990
§ 371 (c)(1),
(2) Date: May 18, 2018

(87) PCT Pub. No.: WO2017/108834
PCT Pub. Date: Jun. 29, 2017

(65) Prior Publication Data
US 2018/0346756 A1 Dec. 6, 2018

(30) Foreign Application Priority Data
Dec. 21, 2015 (EP) .................................... 15201652

(51) Int. Cl.
| | |
|---|---|
| *C08G 18/76* | (2006.01) |
| *C08G 18/32* | (2006.01) |
| *C09K 3/10* | (2006.01) |
| *C09D 175/08* | (2006.01) |
| *C08G 18/48* | (2006.01) |
| *C08G 18/75* | (2006.01) |
| *C08G 18/10* | (2006.01) |
| *C08G 18/12* | (2006.01) |
| *C09D 175/04* | (2006.01) |
| *C09J 175/04* | (2006.01) |
| *C08G 18/22* | (2006.01) |
| *B32B 7/12* | (2006.01) |
| *C09J 175/08* | (2006.01) |

(52) U.S. Cl.
CPC .............. *C09D 175/08* (2013.01); *B32B 7/12* (2013.01); *C08G 18/10* (2013.01); *C08G 18/12* (2013.01); *C08G 18/227* (2013.01); *C08G 18/3256* (2013.01); *C08G 18/3296* (2013.01); *C08G 18/485* (2013.01); *C08G 18/4812* (2013.01); *C08G 18/4825* (2013.01); *C08G 18/4837* (2013.01); *C08G 18/755* (2013.01); *C08G 18/7621* (2013.01); *C08G 18/7664* (2013.01); *C08G 18/7671* (2013.01); *C09D 175/04* (2013.01); *C09J 175/04* (2013.01); *C09J 175/08* (2013.01); *C09K 3/1021* (2013.01)

(58) Field of Classification Search
CPC .... C09D 175/08; B32B 7/12; C08G 18/4812; C08G 18/485; C08G 18/7664; C08G 18/4825; C08G 18/755; C08G 18/7621; C09J 175/08; C09K 3/1021
See application file for complete search history.

(56) References Cited

U.S. PATENT DOCUMENTS

| | | | |
|---|---|---|---|
| 5,087,661 A | 2/1992 | Aoki et al. | |
| 2003/0059599 A1* | 3/2003 | Beckley | C08F 2/16 428/327 |
| 2003/0096893 A1 | 5/2003 | Boomgaard et al. | |
| 2005/0196540 A1* | 9/2005 | Pepe | C04B 41/4869 427/384 |
| 2011/0198030 A1* | 8/2011 | Burckhardt | C08G 18/12 156/331.7 |
| 2015/0111991 A1 | 4/2015 | Kitamura et al. | |

FOREIGN PATENT DOCUMENTS

| | | |
|---|---|---|
| CN | 101646704 A | 2/2010 |
| DE | 25 46 536 A1 | 4/1977 |
| EP | 0947529 A1 | 10/1999 |
| EP | 2017260 A1 | 1/2009 |
| EP | 2 857 378 A1 | 4/2015 |
| JP | 2007177222 A * | 7/2007 |

(Continued)

OTHER PUBLICATIONS

JP2007-177222A Machine Translation (Year: 2007).*
Jun. 26, 2018 International Preliminary Report on Patentability issued in International Application No. PCT/EP2016/081990.
Oct. 10, 2019 Office Action issued in European Patent Application No. 16826721.9.
Apr. 18, 2017 International Search Report issued in International Patent Application No. PCT/EP2016/081990.

(Continued)

*Primary Examiner* — Francisco W Tschen
(74) *Attorney, Agent, or Firm* — Oliff PLC

(57) ABSTRACT

A composition having at least one polyisocyanate and/or at least one isocyanate-group-containing polyurethane polymer and at least one latent hardener having aldimino group(s) of formula (I)—as an elastic adhesive, sealant or coating, which is applied on at least one plasticiser migration sensitive substrate and/or is provided with at least one covering layer and a composite obtained therefrom. The method is characterized in that porous material or stress-crackforming plastics can be used without restriction as substrates and very different materials can be used without restriction as covering layers, without the occurrence of damage associated with plasticiser migration from the composition, such as bleeding, discoloring, spotting, softening, swelling or detachment.

18 Claims, No Drawings

(56) References Cited

FOREIGN PATENT DOCUMENTS

| WO | 00/64860 A1 | 11/2000 |
| --- | --- | --- |
| WO | 03/006521 A1 | 1/2003 |
| WO | 2004/013088 A1 | 2/2004 |
| WO | 2004/013200 A1 | 2/2004 |
| WO | 2007/036575 A1 | 4/2007 |
| WO | 2008/116927 A1 | 10/2008 |
| WO | 2008116900 A1 | 10/2008 |
| WO | 2009/010522 A1 | 1/2009 |

OTHER PUBLICATIONS

Mar. 12, 2020 Office Action issued in European Patent Application No. 16 826 721.9.
Aug. 4, 2020 Office Action issued in Chinese Patent Application No. 201680074642.3.
Apr. 11, 2017 International Search Report issued in International Patent Application No. PCT/EP2016/081979.
Jun. 26, 2018 International Preliminary Reporton Patentability issued in International Patent Application No. PCT/EP2016/081979.
Jun. 10, 2019 Office Action issued in Chilean Patent Application No. 201801449.
Sep. 16, 2019 Office Action issued in U.S. Appl. No. 15/773,972.
Sep. 30, 2019 Office Action issued in European Patent Application No. 16 822 669.4.
Oct. 10, 2019 Office Action issued in Colombian Patent Application No. 2018/0006625.
Mar. 5, 2020 Office Action issued in Chilean Patent Application No. 201801449.
Mar. 22, 2017 International Search Report issued in International Patent Application No. PCT/EP2016/081983.
Jun. 26, 2018 International Preliminary Reporton Patentability issued in International Patent Application No. PCT/P2016/081983.
Feb. 25, 2021 Office Action issued in U.S. Appl. No. 15/776,525.
Mar. 20, 2020 Office Action issued in U.S. Appl. No. 15/776,525.
May 13, 2020 Office Action issued in European Patent Application No. 16 820 246.3.
Jun. 19, 2020 Office Action issued in Chinese Patent Application No. 201680074629.8.
Sep. 15, 2020 Office Action issued in U.S. Appl. No. 15/776,525.
Jan. 7, 2020 Notice of Allowance issued in U.S. Appl. No. 15/773,972.

\* cited by examiner

POLYURETHANE COMPOSITION WITH LOW PLASTICISER MIGRATION

TECHNICAL FIELD

The invention relates to elastic adhesives, sealants and coatings based on polyurethane.

PRIOR ART

Polyurethane compositions which crosslink through reaction of isocyanate groups with moisture or water and cure to give elastomers are especially used as adhesives, sealants or coatings in the construction and manufacturing industry, for example for component bonding in assembly, for filling joins, as floor coating or as roof seal. Owing to their good adhesion and elasticity, they can gently damp forces acting on the substrates, triggered for instance by vibrations or variations in temperature. When compositions of this kind are used at high humidity and/or elevated temperature, however, the curing thereof often proceeds with disruptive blistering that impairs adhesion and strength as a result of carbon dioxide gas released, which is not dissolved or dissipated quickly enough. In order to avoid blistering, it is possible to add chemically blocked amines to the compositions, called latent hardeners, which bind moisture through hydrolysis and release amino groups which react with the isocyanate groups without forming carbon dioxide. Latent hardeners used are usually compounds having aldimine, ketimine or oxazolidine groups. However, the known latent hardeners are often disadvantageous in that they trigger premature crosslinking reactions of the isocyanate groups and hence lower the storage stability of the composition and/or accelerate the curing thereof to such a degree as to result in too short an open time and hence too small a processing window. Moreover, many of the known latent hardeners, on curing, lead to troublesome immissions caused by volatile, intensely odorous aldehydes or ketones which serve as blocking agents in the latent hardener and are released through hydrolysis.

WO 2004/013200 discloses polyurethane compositions comprising latent hardeners, the blocking agents of which are odorless and remain in the cured composition. However, these compositions have the drawback that they have an increased tendency to plasticizer migration, which can be manifested in bleeding, a tacky, slightly soiling surface of the composition, contamination of or damage to the substrates, or in problems with coverage, especially overcoating, overpainting, overlayering or overbonding, of the composition. Particularly critical applications are those on porous materials such as wood, paper, cardboard, gypsum, mortar, concrete, marble or other natural rocks, in that plasticizers that penetrate into the pores have the outward appearance of stains or specks. Further particularly critical applications are those on plastics such as polystyrene, polycarbonate, polyester or PMMA, which are damaged by penetrating plasticizers to such a degree that stress cracks can form therein even under very low stress. Further particularly critical applications are those in which the composition is provided with a polymeric outer layer, in that they are covered, for example, with a paint, a varnish, a coating, an adhesive or sealant or a protective film. Outer layers of this kind can soften or swell as a result of plasticizer migration, become tacky, spotty or cloudy, or become detached from the composition.

EP 0 947 529 discloses one-component polyurethane compounds comprising a prepolymer having isocyanate and latent amino groups. The latent amino groups are based on a benzaldehyde substituted by an aromatic radical, especially 3-phenoxybenzaldehyde. Such benzaldehydes substituted by aromatic radicals exert an undesirably strong plasticizing effect on the cured compound and considerably reduce the stability thereof under stress by moisture, UV radiation and heat. Moreover, these aldehydes are not entirely odorless, but have a readily perceptible odor that lasts for a long time.

SUMMARY OF THE INVENTION

It is therefore an object of the present invention to provide a composition for use as elastic adhesive or sealant or coating for applications sensitive to plasticizer migration, which overcomes the drawbacks of the prior art. It has been found that, surprisingly, this object is achieved by the use of a composition as described in claim 1. The composition comprises at least one polyisocyanate and/or at least one polyurethane polymer containing isocyanate groups and at least one latent hardener having specific aldimino groups. It is used as elastic adhesive, sealant or coating for at least one substrate and/or at least one outer layer that are sensitive to plasticizer migration. Surprisingly, this gives rise to barely any damage caused by plasticizer migration out of the composition, such as bleeding, discoloration, formation of specks, softening, swelling or detachment.

Surprisingly, the aldehyde released from the aldimino groups is not just nonvolatile and odorless but also has particularly good compatibility in the polyurethane matrix. In spite of the long-chain substituent on the aryl radical, it is compatible in polyurethanes to a similar degree to that of aromatic aldehydes without long-chain substituents, but these cause a distinct to strong, long-lasting odor. It barely migrates itself, nor does it cause any enhanced migration of plasticizers. Thus, materials sensitive to plasticizer migration can be used without restrictions as substrate or outer layer with the composition. The low tendency to plasticizer migration is surprising. Latent hardeners having elimination products of high molecular weight are naturally particularly critical in relation to plasticizer migration after curing, since the amount used is correspondingly high owing to the high equivalent weight, and hence a large amount of aldehyde released remains in the cured material. Moreover, the long-chain hydrophobic substituent, especially given branched structure, would be expected to have comparatively poor compatibility in the hydrophilic polymer skeleton of polyurethanes having hydrogen bonds.

The inventive use assures simple handling, in that the composition has good storage stability and a long open time, cures without blistering and does not cause any troublesome immissions. As a result, it remains usable for a long period after production, even under unfavorable storage or transport conditions such as elevated or varying temperature, assures a sufficiently large processing window and faultless curing even under climatically unfavorable application conditions, such as high air humidity and/or temperature or in the case of use of water-containing accelerator components, and is usable in interiors as well without restrictions resulting from immissions.

The invention further provides a bonding composite or sealing composite or coating composite obtained from the use of the invention. The latter is odorless and very stable to moisture, UV radiation and heat, and has a particular feature that, surprisingly, barely any damage triggered by plasticizer migration occurs therein.

Further aspects of the invention are the subject of further independent claims. Particularly preferred embodiments of the invention are the subject of the dependent claims.

Ways of Executing the Invention

The invention provides for the use of a composition comprising
at least one polyisocyanate and/or at least one polyurethane polymer containing isocyanate groups and
at least one latent hardener having aldimino group(s) of the formula (I)

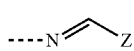

(I)

where Z is an aryl radical substituted by an alkyl or alkoxy group and having a total of 12 to 26 carbon atoms, as elastic adhesive, sealant or coating for at least one substrate and/or at least one outer layer that are sensitive to plasticizer migration.

A dotted line in the formulae in each case represents the bond between a substituent and the corresponding molecular radical.

A "secondary carbon atom" refers to a carbon atom bonded to two hydrogen atoms.

A "tertiary carbon atom" refers to a carbon atom bonded only to one hydrogen atom.

A "quaternary carbon atom" refers to a carbon atom not bonded to any hydrogen atom.

An "aromatic isocyanate" refers to an isocyanate wherein the isocyanate groups are bonded directly to an aromatic carbon atom. Accordingly, isocyanate groups of this kind are referred to as "aromatic isocyanate groups".

"Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is typically determined by means of gel permeation chromatography (GPC) against polystyrene as standard.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

Substance names beginning with "poly", such as polyamine, polyol or polyisocyanate, refer to substances containing, in a formal sense, two or more of the functional groups that occur in their name per molecule.

A "primary polyamine" refers to a compound having at least two primary amino groups.

The term "viscosity" refers to the dynamic viscosity or shear viscosity which is defined by the ratio between the shear stress and the shear rate (speed gradient) and is determined as described in DIN EN ISO 3219.

A substance or composition is referred to as "storage-stable" or "storable" when it can be stored at room temperature in a suitable container over a prolonged period, typically over at least 3 months up to 6 months or more, without any change in its application or use properties to a degree of relevance for the use thereof as a result of the storage.

"Room temperature" refers to a temperature of 23° C.

"Sensitive to plasticizer migration" in respect of a material means that its optical and/or mechanical properties can be altered or damaged to a relevant degree through contact with plasticizer.

"Plasticizers" refer to liquid or dissolved substances which are not chemically incorporated within the cured polymer and typically exert a plasticizing effect on the polymer.

A substrate sensitive to plasticizer migration is especially a porous material or a stress crack-forming plastic.

The porous material here is especially selected from the group consisting of wood, paper, cardboard, gypsum, mortar, fiber cement, concrete and natural stone. Suitable natural stone is especially marble, granite, gneiss, limestone or sandstone, especially marble. Marble is a material having particularly fine pores and is thus particularly sensitive to plasticizer migration.

In this respect, a porous material is sensitive to plasticizer migration in that substances capable of migration can migrate from the cured composition into the pores of the material and thus give rise to specks or soiling in the vicinity of the cured composition.

The stress crack-forming plastic is especially selected from the group consisting of polystyrene, polycarbonate, polyester and PMMA (polymethylmethacrylate).

A stress crack-forming plastic is sensitive to plasticizer migration in that substances capable of migration can migrate out of the cured composition into the plastic and can damage it in such a way that stress cracks form in the plastic even in the case of low stresses in the region of the cured composition, while the rest of the region of the plastic not in contact with the composition does not form any stress cracks. This phenomenon is also referred to as environmental stress cracking (ESC) and occurs mainly in the case of amorphous polymers.

An outer layer sensitive to plasticizer migration especially consists of or cures to form a polymeric material.

Such an outer layer is sensitive to plasticizer migration in that substances capable of migration can migrate from the cured composition in contact therewith into the outer layer and in so doing can disrupt the curing thereof and/or damage it in such a way that their function and/or their visual appearance is impaired. What are observed are especially softening, swelling, tackiness, speck formation or cloudiness of the outer layer, bleeding or adhesion problems, or detachment of the outer layer.

A preferred outer layer is a sealing layer or an adhesive layer or a coating or a protective film.

The sealing layer or adhesive layer is especially a sealant or adhesive based on polyurethane, silane-modified polymer or silicone.

The coating is especially a varnish, a coat of paint or a coating of polyurethane, polyepoxide or polyacrylate.

The protective film is especially a protective film made of plastic.

It is possible that the outer layer consists of the same material as the composition. However, a particularly critical case with regard to plasticizer migration is that in which the composition and the outer layer differ from one another in their formulation, for example in relation to their plasticizer content. Preferably, the composition and outer layer differ from one another in relation to their formulation.

The composition comprises at least one latent hardener having aldimino group(s) of the formula (I).

Z is preferably a radical of the formula (II)

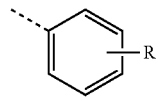

(II)

where R is a linear or branched alkyl or alkoxy radical having 6 to 20, preferably 8 to 16, carbon atoms.

The aldimino group of the formula (I) is thus preferably

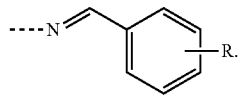

R is preferably a linear or branched alkyl radical having 10 to 14 carbon atoms or a linear or branched alkoxy radical having 8 to 12 carbon atoms.

R is especially a linear or branched alkyl radical having 10 to 14 carbon atoms. A latent hardener of this kind is particularly reactive.

R is more preferably a branched alkyl radical. A latent hardener of this kind is typically liquid and of comparatively low viscosity at room temperature, which is very advantageous for handling thereof.

R is most preferably a branched alkyl radical having 10 to 14 carbon atoms. A latent hardener of this kind is particularly reactive and is usually liquid and of comparatively low viscosity at room temperature.

Preferably, R is in the meta or para position, especially in the para position. Latent hardeners of this kind have particularly good obtainability.

Most preferably, R is a radical of the formula

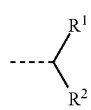

where $R^1$ and $R^2$ are each an alkyl radical and together have 9 to 13 carbon atoms. Preferably, the $R^1$ and $R^2$ radicals are each linear.

Most preferably, Z is thus a radical of the formula (IIa)

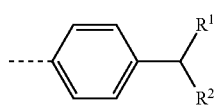

(IIa)

where $R^1$ and $R^2$ have the definitions given.

The aldimino group of the formula (I) is thus most preferably

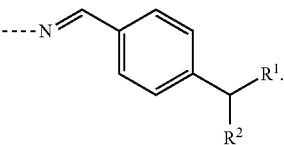

Latent hardeners of this kind have particularly good obtainability and particularly low odor, and are typically liquid at room temperature.

The latent hardener having aldimino group(s) of the formula (I) is preferably a polyaldimine of the formula (III)

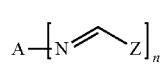

(III)

where
n is 2 or 3,
A is an n-valent hydrocarbyl radical optionally containing ether oxygen and having a molecular weight in the range from 28 to 6'000 g/mol, and
Z has the definitions already given.

A polyaldimine of the formula (III) is typically liquid at room temperature and is storage-stable together with polyisocyanates.

Preferably, n is 2.

Preferably, A is an n-valent aliphatic, cycloaliphatic or arylaliphatic hydrocarbyl radical optionally containing ether oxygen and having a molecular weight in the range from 28 to 6'000 g/mol. The use of such compositions based on aliphatic amines is particularly advantageous in toxicological terms.

More preferably, A is a divalent aliphatic, cycloaliphatic or arylaliphatic hydrocarbyl radical having a molecular weight in the range from 28 to 300 g/mol, which is bonded via a secondary carbon atom and has mirror symmetry. Latent hardeners of this kind enable particularly rapid curing and enable a particularly high modulus of elasticity.

A here is especially selected from the group consisting of 1,2-ethylene, 1,3-propylene, 1,4-butylene, 1,5-pentylene, 1,6-hexylene, 1,8-octylene, 1,10-decylene, 1,12-dodecylene, 1,3-cyclohexylenebis(methylene), 1,4-cyclohexylenebis(methylene), 1,3-phenylenebis(methylene) and 1,4-phenylenebis(methylene).

Among these, preference is given to 1,6-hexylene, 1,12-dodecylene, 1,3-cyclohexylenebis(methylene), 1,4-cyclohexylenebis(methylene), 1,3-phenylenebis(methylene) or 1,4-phenylenebis(methylene).

Latent hardeners of this kind have particularly good obtainability.

More preferably, in addition, A is either a divalent aliphatic or cycloaliphatic hydrocarbyl radical which has a molecular weight in the range from 42 to 500 g/mol and is bonded via at least one tertiary or quaternary carbon atom and/or contains a bi- or tricyclic ring system, or is an n-valent polyoxyalkylene radical which has a molecular weight in the range from 170 to 6'000 g/mol and is bonded terminally via at least one tertiary or quaternary carbon atom. Latent hardeners of this kind are particularly storage-stable, especially with aromatic isocyanate groups, and result in particularly good mechanical properties.

A here is especially selected from the group consisting of 1,2-propylene, 1,3-pentylene, 1,2-cyclohexylene, 1,3-cyclohexylene, 1,4-cyclohexylene, (1,5,5-trimethylcyclohexan-1-yl)methane-1,3, 4(2)-methyl-1,3-cyclohexylene, methylenedicyclohexan-4-yl, methylenebis(2-methylcyclohexan-4-yl), (bicyclo[2.2.1]heptan-2,5(2,6)-diyl)dimethylene, (tricyclo[5.2.1.0$^{2,6}$]decane-3(4),8(9)-diyl)dimethylene, α,ω-polyoxypropylene having an average molecular weight in the range from 170 to 4'000 g/mol and trimethylolpropane- or glycerol-started tris(w-polyoxypropylene) having an average molecular weight in the range from 330 to 6'000 g/mol.

Among these, preference is given to (1,5,5-trimethylcyclohexan-1-yl)methane-1,3, 4(2)-methyl-1,3-cyclohexylene, 1,2-cyclohexylene, methylenedicyclohexan-4-yl, (bicyclo[2.2.1]heptan-2,5(2,6)-diyl)dimethylene, (tricyclo[5.2.1.0$^{2,6}$]decane-3(4),8(9)-diyl)dimethylene, α,ω-polyoxypropylene having an average molecular weight in the range from 170 to 2'000 g/mol, especially 170 to 470 g/mol, and trimethylolpropane- or glycerol-started tris(w-polyoxypropylene) having an average molecular weight in the range from 330 to 450 g/mol.

Latent hardeners of this kind have particularly good obtainability.

The latent hardener having aldimino group(s) of the formula (I) is further preferably an aldimine of the formula (IV)

(IV)

where
A' is a divalent aliphatic or cycloaliphatic or arylaliphatic hydrocarbyl radical optionally having ether oxygen or amine nitrogen and having a molecular weight in the range from 28 to 500 g/mol,
X is O or S or NR$^0$ where R$^0$ is a hydrogen radical or is a hydrocarbyl radical which has 1 to 30 carbon atoms and optionally contains at least one carboxylic ester, nitrile, nitro, phosphonic ester, sulfone or sulfonic ester group or aldimino group of the formula (I), and
Z has the definitions already given.

An aldimine of the formula (IV) is optionally in equilibrium with a cyclic compound of the formula (IV')

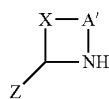
(IV')

where X, A' and Z have the definitions already given. Compounds of the formula (IV') are observed especially in the case that the aldimino group and the HX group in the aldimine of the formula (IV) are separated by two or three carbon atoms; in this case they are 2-substituted 1,3-oxazolidines (5-membered ring) or tetrahydro-1,3-oxazines (6-membered ring).

A' is preferably selected from the group consisting of 1,2-ethylene, 1,2-propylene, 1,3-propylene, 1,5-pentylene, 1,6-hexylene, (1,5,5-trimethylcyclohexan-1-yl)methane-1,3 and 3-oxa-1,5-pentylene.

Among these, preference is given to 1,2-ethylene, 1,3-propylene, 1,6-hexylene, (1,5,5-trimethylcyclohexan-1-yl)methane-1,3 or 3-oxa-1,5-pentylene.

Preferably, X is O or NR$^0$.

Preferably, R$^0$ is a hydrogen radical or a monovalent hydrocarbyl radical having 1 to 18, especially 1 to 12, carbon atoms, or is

where L is an alkylene radical having 1 to 6 carbon atoms, especially ethylene, 1,3-propylene or 1,6-hexylene.

More preferably, R$^0$ is a monovalent hydrocarbyl radical having 1 to 12 carbon atoms or is

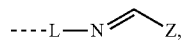

especially methyl, ethyl, cyclohexyl, benzyl or

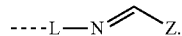

If X is O, A is especially (1,5,5-trimethylcyclohexan-1-yl)methane-1,3 or 3-oxa-1,5-pentylene.

If X is NR$^0$, A is especially ethylene and R$^0$ is

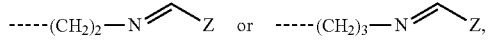

or A is 1,3-propylene and R$^0$ is

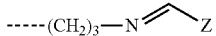

or methyl, ethyl or cyclohexyl, or A is 1,6-hexylene and R$^0$ is

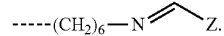

The latent hardener having aldimino group(s) of the formula (I) is further preferably a reaction product having aldimino group(s) of the formula (V)

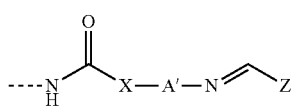
(V)

where X, A' and Z have the definitions already given.

The reaction product having aldimino group(s) of the formula (V) is especially obtained from the reaction of at least one aldimine of the formula (IV) with at least one polyisocyanate.

For the reaction, at least one aldimine of the formula (IV) is mixed with at least one polyisocyanate with exclusion of moisture, where the HX groups react with isocyanate groups available. The reaction can be effected at ambient temperature or at an elevated temperature. Preference is given to a temperature in the range from 0 to 180° C., preferably 10 to 180° C., especially 20 to 180° C. A catalyst may be present here, especially a bismuth(III), zinc(II), zirconium(IV) or tin(II) compound or an organotin(IV) compound. In the reaction, it is possible for further constituents of substances typically used in polyurethane compositions to be present, for example catalysts, fillers, plasticizers or solvents.

The reaction can be conducted in a substoichiometric manner, i.e. at an OH/NCO ratio below 1. What is obtained here is a reaction product having not only aldimino groups but additionally also isocyanate groups.

The reaction can also be conducted in a stoichiometric or superstoichiometric manner, i.e. at an OH/NCO ratio of 1 or higher. What is obtained here is a reaction product free of isocyanate groups.

Suitable polyisocyanates for the preparation of a reaction product having aldimino group(s) of the formula (V) are those mentioned hereinafter as a constituent of the composition.

The reaction product having aldimino group(s) of the formula (V) can be prepared separately from the composition described, or it can be formed in situ in the composition described.

A most preferred latent hardener having aldimino group(s) of the formula (I) is a polyaldimine of the formula (III).

The preferred latent hardeners having aldimino group(s) of the formula (I) result in particularly good properties for the use of the invention and have particularly good obtainability and/or particularly low viscosity and/or enable compositions having particularly good storage stability and/or particularly good mechanical properties or stabilities.

More preferably, the latent hardener having aldimino group(s) of the formula (I) is selected from the group consisting of N,N'-bis(4-alkylbenzylidene)-1,6-hexanediamine, N,N'-bis(4-alkylbenzylidene)-1,12-dodecanediamine, N,N'-bis(4-alkylbenzylidene)-1,3-bis(aminomethyl)cyclohexane, N,N'-bis(4-alkylbenzylidene)-1,4-bis(aminomethyl)cyclohexane, N,N'-bis(4-alkylbenzylidene)-1,3-bis(aminomethyl)benzene, N,N'-bis(4-alkylbenzylidene)-1,4-bis(aminomethyl)benzene, N,N'-bis(4-alkylbenzylidene)-3-aminomethyl-3,5,5-trimethylcyclohexylamine, N,N'-bis(4-alkylbenzylidene)-4(2)-methyl-1,3-cyclohexanediamine, N,N'-bis(4-alkylbenzylidene)-1,2-cyclohexanediamine, N,N'-bis(4-alkylbenzylidene)-bis(4-aminocyclohexyl)methane, N,N'-bis(4-alkylbenzylidene)-2,5(2,6)-bis(aminomethyl)bicyclo[2.2.1]heptane, N,N'-bis(4-alkylbenzylidene)-3(4),8(9)-bis(aminomethyl)tricyclo[5.2.1.0$^{2,6}$]decane, N,N'-bis(4-alkylbenzylidene)polyoxypropylenediamine having an average molecular weight in the range from 650 to 1050 g/mol, N,N',N"-tris(4-alkylbenzylidene)polyoxypropylenetriamine having an average molecular weight in the range from 1050 to 1350 g/mol and reaction products of N-(4-alkylbenzylidene)-3-aminomethyl-3,5,5-trimethylcyclohexanol or N-(4-alkylbenzylidene)-2-(2-aminoethoxy)ethanol or N-(4-alkylbenzylidene)-N'-methyl-1,3-propanediamine or N-(4-alkylbenzylidene)-N'-ethyl-1,3-propanediamine or N-(4-alkylbenzylidene)-N-cyclohexyl-1,3-propanediamine or N,N"-bis(4-alkylbenzylidene)-N'-(2-aminoethyl)ethane-1,2-diamine or N,N"-bis(4-alkylbenzylidene)-N'-(3-aminopropyl)propane-1,3-diamine or N,N"-bis(4-alkylbenzylidene)-N'-(2-aminoethyl)propane-1,3-diamine or N,N"-bis(4-alkylbenzylidene)-N'-(6-aminohexyl)hexane-1,6-diamine with polyisocyanates, where alkyl in each case is a linear or particularly branched decyl, undecyl, dodecyl, tridecyl or tetradecyl radical.

The latent hardener having aldimino group(s) of the formula (I) is preferably obtained from the reaction of at least one compound having primary amino groups with at least one aldehyde of the formula (VI) in a condensation reaction with release of water, optionally followed by the reaction with at least one polyisocyanate to give a reaction product having aldimino group(s) of the formula (V).

In the formula (VI), Z has the definitions already given.

The aldehyde of the formula (IV) is preferably used here stoichiometrically or in a stoichiometric excess in relation to the primary amino groups. In this manner, the reaction product is largely or entirely free of primary amino groups.

The latent hardener having aldimino group(s) of the formula (I) is preferably used in the form of a reaction product from this reaction, where the aldehyde was present stoichiometrically or in a stoichiometric excess in relation to the primary amino groups.

The reaction is advantageously conducted at a temperature in the range from 15 to 120° C., preferably at 20 to 100° C., optionally in the presence of a solvent. The water of condensation is preferably removed from the reaction mixture, either as an azeotrope with a suitable solvent or preferably directly by distillation, optionally under reduced pressure.

Optionally, a catalyst is used in the reaction, especially an acid catalyst. Particular preference is given to working without solvent and removing the water of condensation from the heated reaction mixture by means of application of reduced pressure.

A reaction product of this kind can be used without further workup as latent hardener in the composition.

Preference is given to combining the compound having primary amino groups and the aldehyde of the formula (VI) to give a reaction mixture, where the aldehyde is present stoichiometrically or in a stoichiometric excess in relation to the primary amino groups, and the water of condensation is removed from the reaction mixture by a suitable method, optionally while heating the reaction mixture.

A preferred compound having primary amino groups is a primary polyamine of the formula A$-$(NH$_2$)$_n$, where A and n have the definitions already given. The following are especially suitable: 1,2-ethanediamine, 1,2-propanediamine, 1,3-propanediamine, 1,4-butanediamine, 1,3-butanediamine, 2-methyl-1,2-propanediamine, 1,3-pentanediamine, 1,5-pentanediamine, 2,2-dimethyl-1,3-propanediamine, 1,6-hexanediamine, 1,5-diamino-2-methylpentane, 1,3,6-triaminohexane, 1,7-heptanediamine, 1,8-octanediamine, 1,4,8-triaminooctane, 2,5-dimethyl-1,6-hexanediamine, 1,9-nonanediamine, 2,2(4),4-trimethyl-1,6-hexanediamine, 4-aminomethyl-1,8-octanediamine, 5-aminomethyl-1,8-octanediamine, 1,10-decanediamine, 1,11-undecanediamine, 1,6,11-triaminoundecane, 2-butyl-2-ethyl-1,5-pentanediamine, 1,12-dodecanediamine, 1,2-cyclohexanediamine, 1,3-cyclohexanediamine, 1,4-cyclohexanediamine, 1,3,5-triaminocyclohexane, 1-amino-3-aminomethyl-3,5,5-trimethylcyclohexane, 4(2)-methyl-1,3-cyclohexanediamine, 1,3-bis(aminomethyl)cyclohexane, 1,4-bis(aminomethyl)cyclohexane, 1,3,5-tris(aminomethyl)cyclohexane, bis(4-aminocyclohexyl)methane, bis(4-amino-3-methylcyclohexyl)methane, bis(4-amino-3-ethylcyclohexyl)methane, bis-(4-amino-3,5-dimethylcyclohexyl)methane, bis(4-amino-3-ethyl-5-methylcyclohexyl)methane, 2,5(2,6)-bis(aminomethyl)bicyclo[2.2.1]heptane, 3(4),8(9)-bis(aminomethyl)tricyclo[5.2.1.0$^{2,6}$]decane, 1,3-bis(aminomethyl) benzene, 1,4-bis(aminomethyl)benzene, 1,3,5-tris (aminomethyl)benzene, 3-oxa-1,5-pentanediamine, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine, α,ω-polyoxypropylenediamine having an average molecular weight in the range from 200 to 4'000 g/mol, especially the Jeffamine® products D-230, D-400, XTJ-582, D-2000, XTJ-578, D-4000 (all from Huntsman), α,ω-polyoxypropylenepolyoxyethylenediamine, especially the Jeffamine® products ED-600, ED-900, ED-2003, HK-511 (all from Huntsman), α,ω-polyoxypropylenepolyoxy-1,4-butylenediamine, especially the Jeffamine® products THF-100, THF-140, THF-230, XTJ-533 or XTJ-536 (all from Huntsman), α,ω-polyoxypropylenepolyoxy-1,2-butylenediamine, especially the Jeffamine® products XTJ-568 or XTJ-569 (both from Huntsman), α,ω-polyoxy-1,2-butylenediamine, especially Jeffamine® XTJ-523 (from Huntsman), trimethylolpropane- or glycerol-started tris(ω-polyoxypropyleneamine) having an average molecular weight in the range from 380 to 6'000 g/mol, especially the Jeffamine® products T-403, T-3000 or T-5000 (all from Huntsman), trimethylolpropane-started tris(w-polyoxypropylenepolyoxy-1,2-butyleneamine), especially Jeffamine® XTJ-566 (from Huntsman), 1,3-phenylenediamine, 1,4-phenylenediamine, 4(2)-methyl-1,3-phenylenediamine (TDA), 3,5-diethyl-2,4(6)-tolylenediamine (DETDA) or 4,4'-diaminodiphenylmethane (MDA).

Among these, preference is given to 1,2-ethanediamine, 1,2-propanediamine, 1,3-propanediamine, 1,4-butanediamine, 1,3-pentanediamine, 1,5-pentanediamine, 1,6-hexanediamine, 1,8-octanediamine, 1,10-decanediamine, 1,12-dodecanediamine, 1,2-cyclohexanediamine, 1,3-cyclohexanediamine, 1,4-cyclohexanediamine, 1-amino-3-aminomethyl-3,5,5-trimethylcyclohexane, 4(2)-methyl-1,3-cyclohexanediamine, 1,3-bis(aminomethyl)cyclohexane, 1,4-bis(aminomethyl)cyclohexane, bis(4-aminocyclohexyl) methane, bis(4-amino-3-methylcyclohexyl)methane, 2,5(2, 6)-bis(aminomethyl)bicyclo[2.2.1]heptane, 3(4),8(9)-bis (aminomethyl)tricyclo[5.2.1.0$^{2,6}$]decane, 1,3-bis (aminomethyl)benzene, 1,4-bis(aminomethyl)benzene, polyoxypropylenediamine having an average molecular weight in the range from 200 to 4'000 g/mol, or trimethylolpropane- or glycerol-started polyoxypropylenetriamine having an average molecular weight in the range from 380 to 6'000 g/mol.

Preferred polyoxypropylenedi- or -triamines are the commercial products Jeffamine® D-230, Jeffamine® D-400, Jeffamine® D-2000, Jeffamine® D-4000, Jeffamine® T-403, Jeffamine® T-3000, Jeffamine® T-5000 (from Huntsman) or equivalent products from other manufacturers, especially Jeffamine® D-230, Jeffamine® D-400 or Jeffamine® T-403 or equivalent products from other manufacturers.

Particular preference is given to 1,6-hexanediamine, 1,12-dodecanediamine, 1,3-bis(aminomethyl)cyclohexane, 1,4-bis(aminomethyl)cyclohexane, 1,3-bis(aminomethyl)benzene or 1,4-bis(aminomethyl)benzene.

Particular preference is further given to 1-amino-3-aminomethyl-3,5,5-trimethylcyclohexane, 4(2)-methyl-1,3-cyclohexanediamine, 1,2-cyclohexanediamine, bis(4-aminocyclohexyl)methane, 2,5(2,6)-bis(aminomethyl)bicyclo [2.2.1]heptane, 3(4),8(9)-bis(aminomethyl)tricyclo[5.2.1.0$^{2,6}$]decane, polyoxypropylenediamine having an average molecular weight in the range from 200 to 2'000 g/mol, especially 200 to 500 g/mol, or trimethylolpropane- or glycerol-started polyoxypropylenetriamine having an average molecular weight in the range from 380 to 500 g/mol.

A further preferred compound having primary amino groups is a primary amine of the formula HX-A'-NH$_2$ where X and A' have the definitions already given.

The following are especially suitable: 2-aminoethanol, 2-amino-1-propanol, 1-amino-2-propanol, 3-amino-1-propanol, 4-amino-1-butanol, 4-amino-2-butanol, 2-amino-2-methylpropanol, 5-amino-1-pentanol, 6-amino-1-hexanol, 7-amino-1-heptanol, 8-amino-1-octanol, 10-amino-1-decanol, 12-amino-1-dodecanol or higher homologs thereof, 4-(2-aminoethyl)-2-hydroxyethylbenzene, 3-aminomethyl-3,5,5-trimethylcyclohexanol, derivatives of glycols such as diethylene glycol, dipropylene glycol, dibutylene glycol or higher oligomers or polymers of these glycols that bear a primary amino group, especially 2-(2-aminoethoxy)ethanol, 2-(2-(2-aminoethoxy)ethoxy)ethanol or α-(2-hydroxymethylethyl)-w-(2-aminomethylethoxy)poly(oxy(methyl-1,2-ethanediyl), products from the single cyanoethylation and subsequent hydrogenation of glycols, especially 3-(2-hydroxyethoxy)propylamine, 3-(2-(2-hydroxyethoxy)ethoxy) propylamine, 3-(6-hydroxyhexyloxy)propylamine, mercapto amines such as, in particular, 2-aminoethanethiol, 3-aminopropanethiol, 4-amino-1-butanethiol, 6-amino-1-hexanethiol, 8-amino-1-octanethiol, 10-amino-1-decanethiol or 12-amino-1-dodecanethiol, and also N-methyl-1,2-ethanediamine, N-ethyl-1,2-ethanediamine, N-butyl-1, 2-ethanediamine, N-hexyl-1,2-ethanediamine, N-(2-ethylhexyl)-1,2-ethanediamine, N-cyclohexyl-1,2-ethanediamine, 4-aminomethylpiperidine, 3-(4-aminobutyl) piperidine, N-(2-aminoethyl)piperazine, N-(2-aminopropyl) piperazine, diamines from the cyanoethylation or cyanobutylation and subsequent hydrogenation of primary monoamines, such as, in particular, N-methyl-1,3-propanediamine, N-ethyl-1,3-propanediamine, N-butyl-1,3-propanediamine, N-hexyl-1,3-propanediamine, N-(2-ethylhexyl)-1,3-propanediamine, N-dodecyl-1,3-propanediamine, N-cyclohexyl-1,3-propanediamine, 3-methylamino-1-pentylamine, 3-ethylamino-1-pentylamine, 3-butylamino-1-pentylamine, 3-hexylamino-1-pentylamine, 3-(2-ethylhexyl)amino-1-pentylamine, 3-dodecylamino-1-pentylamine or 3-cyclohexylamino-1-pentylamine, or fatty diamines such as N-cocoalkyl-1,3-propanediamine, N-oleyl-1,3-propanediamine, N-soyaalkyl-1,3-propanediamine, N-tallowalkyl-1,3-propanediamine or N—(C$_{16-22}$-alkyl)-1,3-propanediamine, as obtainable, for example, under the Duomeen® trade name from Akzo Nobel, the products from the Michael-type addition of aliphatic primary diamines with acrylonitrile, maleic or fumaric diesters, citraconic diesters, (meth)acrylic esters, (meth)acrylamides or itaconic diesters, reacted in a molar ratio of 1:1, and also bis(hexamethylene)triamine (BHMT), diethylenetriamine (DETA), dipropylenetriamine (DPTA), N-(2-aminoethyl)-1,3-propanediamine (N3-amine), N3-(3-aminopentyl)-1,3-pentanediamine or N5-(3-amino-1-ethylpropyl)-2-methyl-1, 5-pentanediamine.

Among these, preference is given to 2-aminoethanol, 2-amino-1-propanol, 1-amino-2-propanol, 3-amino-1-propanol, 5-amino-1-pentanol, 6-amino-1-hexanol, 3-aminomethyl-3,5,5-trimethylcyclohexanol, 2-(2-aminoethoxy)ethanol, N-methyl-1,2-ethanediamine, N-ethyl-1,2-ethanediamine, N-butyl-1,2-ethanediamine, N-hexyl-1,2-ethanediamine, N-(2-ethylhexyl)-1,2-ethanediamine, N-cyclohexyl-1,2-ethanediamine, N-methyl-1,3-propanediamine, N-ethyl-1,3-propanediamine, N-butyl-1,3-propanediamine, N-hexyl-1,3-propanediamine, N-(2-ethylhexyl)-1, 3-propanediamine, N-dodecyl-1,3-propanediamine, N-cyclohexyl-1,3-propanediamine, bis(hexamethylene)triamine, diethylenetriamine, dipropylenetriamine or N-(2-aminoethyl)-1,3-propanediamine.

Particular preference is given to 3-aminomethyl-3,5,5-trimethylcyclohexanol, 2-(2-aminoethoxy)ethanol, N-methyl-1,3-propanediamine, N-ethyl-1,3-propanediamine, N-cyclohexyl-1,3-propanediamine, bis(hexamethylene)triamine, diethylenetriamine, dipropylenetriamine or N-(2-aminoethyl)-1,3-propanediamine.

A preferred aldehyde of the formula (VI) is an aldehyde of the formula (VIa) where R has the definitions already described.

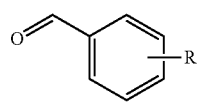

(VIa)

A particularly preferred aldehyde of the formula (VI) is an aldehyde of the formula (VIb) where $R^1$ and $R^2$ have the definitions already described.

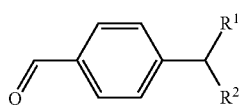

(VIb)

Especially preferred aldehydes of the formula (VI) are 4-decylbenzaldehydes, 4-undecylbenzaldehydes, 4-dodecylbenzaldehydes, 4-tridecylbenzaldehydes or 4-tetradecylbenzaldehydes, in which the alkyl radicals are linear or branched, especially branched.

A most preferred aldehyde of the formula (VI) is a mixture comprising 4-decylbenzaldehydes, 4-undecylbenzaldehydes, 4-dodecylbenzaldehydes, 4-tridecylbenzaldehydes or 4-tetradecylbenzaldehydes, the alkyl radicals of which are mainly branched.

Preferably, the composition comprises a mixture of latent hardeners having aldimino group(s) of the formula (I) in which each Z is a radical of the formula (II) and R is selected from alkyl radicals having 6 to 20 carbon atoms. More preferably, the composition comprises a mixture of latent hardeners having aldimino group(s) of the formula (I) in which each Z is a radical of the formula (II) and R is selected from linear or particularly branched decyl, undecyl, dodecyl, tridecyl and tetradecyl radicals.

A mixture of this kind is industrially obtainable particularly easily.

The composition further comprises at least one polyisocyanate and/or at least one polyurethane polymer containing isocyanate groups.

A suitable polyisocyanate is especially a commercially available polyisocyanate, especially aromatic di- or triisocyanates, preferably diphenylmethane 4,4'- or 2,4'- or 2,2'-diisocyanate or any mixtures of these isomers (MDI), tolylene 2,4- or 2,6-diisocyanate or any mixtures of these isomers (101), mixtures of MDI and MDI homologs (polymeric MDI or PMDI), phenylene 1,3- or 1,4-diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODD, dianisidine diisocyanate (DADI), tris(4-isocyanatophenyl)methane or tris(4-isocyanatophenyl) thiophosphate; preferably MDI or TDI;

aliphatic, cycloaliphatic or arylaliphatic di- or triisocyanates, preferably tetramethylene 1,4-diisocyanate, 2-methylpentamethylene 1,5-diisocyanate, hexamethylene 1,6-diisocyanate (HDI), 2,2,4- and/or 2,4,4-trimethylhexamethylene 1,6-diisocyanate (TMDI), decamethylene 1,10-diisocyanate, dodecamethylene 1,12-diisocyanate, lysine diisocyanate or lysine ester diisocyanate, cyclohexane 1,3- or 1,4-diisocyanate, 1-methyl-2,4- and/or -2,6-diisocyanatocyclohexane ($H_6$TDI), 1-isocyanato-3,3,5-trimethyl-5-isocyanatomethylcyclohexane (IPDI), perhydro-2,4'- and/or -4,4'-diphenylmethane diisocyanate ($H_{12}$MDI), 1,3- or 1,4-bis-(isocyanatomethyl)cyclohexane, m- or p-xylylene diisocyanate, tetramethylxylylene 1,3- or 1,4-diisocyanate, 1,3,5-tris(isocyanatomethyl)benzene, bis(1-isocyanato-1-methylethyl)naphthalene, dimer or trimer fatty acid isocyanates such as, in particular, 3,6-bis(9-isocyanatononyl)-4,5-di-(1-heptenyl)cyclohexene (dimeryl diisocyanate); preferably $H_{12}$MDI or HDI or IPDI;

oligomers or derivatives of the di- or triisocyanates mentioned, especially derived from HDI, IPDI, MDI or TDI, especially oligomers containing uretdione or isocyanurate or iminooxadiazinedione groups or various groups among these; or di- or polyfunctional derivatives containing ester or urea or urethane or biuret or allophanate or carbodiimide or uretonimine or oxadiazinetrione groups or various groups among these. In practice, polyisocyanates of this kind are typically mixtures of substances having different degrees of oligomerization and/or chemical structures. They especially have an average NCO functionality of 2.1 to 4.0.

A particularly preferred polyisocyanate is HDI, IPDI, $H_{12}$MDI, TDI, MDI or a form of MDI which is liquid at room temperature.

A form of MDI which is liquid at room temperature is either 4,4'-MDI liquefied by partial chemical modification—especially carbodiimidization or uretonimine formation or adduct formation with polyols—or it is a mixture of 4,4'-MDI with other MDI isomers (2,4'-MDI and/or 2,2'-MDI), and/or with MDI oligomers and/or MDI homologs (PMDI), that has been brought about selectively by blending or results from the production process.

A suitable polyurethane polymer containing isocyanate groups is especially obtained from the reaction of at least one polyol with a superstoichiometric amount of at least one polyisocyanate. The reaction is preferably conducted with exclusion of moisture at a temperature in the range from 50 to 160° C., optionally in the presence of suitable catalysts. The NCO/OH ratio is preferably in the range from 1.3/1 to 2.5/1. The polyisocyanate remaining after the conversion of the OH groups in the reaction mixture, especially monomeric diisocyanate, can be removed, especially by means of distillation, which is preferable in the case of a high NCO/OH ratio. The polyurethane polymer obtained preferably has a content of free isocyanate groups in the range from 0.5% to 10% by weight, especially 1% to 5% by weight, more preferably 1% to 3% by weight. The polyurethane polymer can optionally be prepared with additional use of plasticizers or solvents, in which case the plasticizers or solvents used do not contain any groups reactive toward isocyanates.

Preferred polyisocyanates for preparation of a polyurethane polymer containing isocyanate groups are the polyisocyanates already mentioned, especially the diisocyanates, especially MDI, TDI, IPDI, HDI or $H_{12}$MDI.

Suitable polyols are commercial polyols or mixtures thereof, especially polyether polyols, especially polyoxyalkylenediols and/or polyoxyalkylenetriols, especially polymerization products of ethylene oxide or 1,2-propylene oxide or 1,2- or 2,3-butylene oxide or oxetane or tetrahydrofuran or mixtures thereof, where these may have been polymerized with the aid of a starter molecule having two or more active hydrogen atoms, especially a starter molecule such as water, ammonia or a compound having multiple OH or NH groups, for example 1,2-ethanediol, 1,2- or 1,3-propanediol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, 1,3- or 1,4-cyclohexanedimethanol, bisphenol A, hydrogenated bisphenol A, 1,1,1-trimethylolethane, 1,1,1-trimethylolpropane, glycerol or aniline, or mixtures of the aforementioned compounds. Likewise suitable are polyether polyols with polymer particles dispersed therein, especially those with styrene-acrylonitrile particles (SAN) or polyurea or polyhydrazodicarbonamide particles (PHD).

Preferred polyether polyols are polyoxypropylenediols or polyoxypropylenetriols, or what are called ethylene oxide-terminated (EO-endcapped) polyoxypropylenediols or -triols. The latter are mixed polyoxyethylene-polyoxypropylene polyols which are especially obtained in that polyoxypropylenediols or -triols, on conclusion of the polypropoxylation reaction, are further alkoxylated with ethylene oxide and hence ultimately have primary hydroxyl groups.

Preferred polyether polyols have a degree of unsaturation of less than 0.02 meq/g, especially less than 0.01 meq/g.

Polyester polyols, also called oligoesterols, prepared by known processes, especially the polycondensation of hydroxycarboxylic acids or lactones or the polycondensation of aliphatic and/or aromatic polycarboxylic acids with di- or polyhydric alcohols. Preference is given to polyester diols from the reaction of dihydric alcohols, such as, in particular, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, with organic dicarboxylic acids or the anhydrides or esters thereof, such as, in particular, succinic acid, glutaric acid, adipic acid, suberic acid, sebacic acid, dodecanedicarboxylic acid, maleic acid, fumaric acid, phthalic acid, isophthalic acid, terephthalic acid or hexahydrophthalic acid or mixtures of the aforementioned acids, or polyester polyols formed from lactones such as, in particular, ε-caprolactone. Particular preference is given to polyester polyols formed from adipic acid or sebacic acid or dodecanedicarboxylic acid and hexanediol or neopentyl glycol.

Polycarbonate polyols as obtainable by reaction, for example, of the abovementioned alcohols—used to form the polyester polyols—with dialkyl carbonates, diaryl carbonates or phosgene.

Block copolymers bearing at least two hydroxyl groups and having at least two different blocks having polyether, polyester and/or polycarbonate structure of the type described above, especially polyether polyester polyols.

Polyacrylate polyols and polymethacrylate polyols.

Polyhydroxy-functional fats and oils, for example natural fats and oils, especially castor oil; or polyols obtained by chemical modification of natural fats and oils—called oleochemical polyols—for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical linkage, for example by transesterification or dimerization, of the degradation products or derivatives thereof thus obtained. Suitable degradation products of natural fats and oils are especially fatty acids and fatty alcohols, and also fatty acid esters, especially the methyl esters (FAME), which can, for example, be derivatized to hydroxy fatty acid esters by hydroformylation and hydrogenation.

Polyhydrocarbon polyols, also called oligohydrocarbonols, for example polyhydroxy-functional polyolefins, polyisobutylenes, polyisoprenes; polyhydroxy-functional ethylene-propylene, ethylene-butylene or ethylene-propylene-diene copolymers as produced, for example, by Kraton Polymers; polyhydroxy-functional polymers of dienes, especially of 1,3-butadiene, which can especially also be prepared from anionic polymerization; polyhydroxy-functional copolymers of dienes such as 1,3-butadiene or diene mixtures and vinyl monomers such as styrene, acrylonitrile, vinyl chloride, vinyl acetate, vinyl alcohol, isobutylene and isoprene, for example polyhydroxy-functional acrylonitrile/butadiene copolymers as preparable, for example, from epoxides or amino alcohols and carboxyl-terminated acrylonitrile/butadiene copolymers (commercially available, for example, under the Hypro® CTBN or CTBNX or ETBN name from Emerald Performance Materials); and hydrogenated polyhydroxy-functional polymers or copolymers of dienes.

Also especially suitable are mixtures of polyols.

Preference is given to polyether polyols, polyester polyols, polycarbonate polyols, poly(meth)acrylate polyols or polybutadiene polyols.

Particular preference is given to polyether polyols, polyester polyols, especially aliphatic polyester polyols, for polycarbonate polyols, especially aliphatic polycarbonate polyols.

Most preferred are polyether polyols, especially polyoxypropylenedi- or triols or ethylene oxide-terminated polyoxypropylenedi- or triols.

Preference is given to polyols having an average molecular weight in the range from 400 to 20'000 g/mol, preferably from 1'000 to 15'000 g/mol.

Preference is given to polyols having an average OH functionality in the range from 1.6 to 3.

Preference is given to polyols that are liquid at room temperature.

In the preparation of a polyurethane polymer containing isocyanate groups, it is also possible to use fractions of di- or polyfunctional alcohols, especially 1,2-ethanediol, 1,2-propanediol, 1,3-propanediol, 2-methyl-1,3-propanediol, 1,2-butanediol, 1,3-butanediol, 1,4-butanediol, 1,3-pentanediol, 1,5-pentanediol, 3-methyl-1,5-pentanediol, neopentyl glycol, dibromoneopentyl glycol, 1,2-hexanediol, 1,6-hexanediol, 1,7-heptanediol, 1,2-octanediol, 1,8-octanediol, 2-ethyl-1,3-hexanediol, diethylene glycol, triethylene glycol, dipropylene glycol, tripropylene glycol, 1,3- or 1,4- cyclohexanedimethanol, ethoxylated bisphenol A, propoxylated bisphenol A, cyclohexanediol, hydrogenated bisphenol A, dimer fatty acid alcohols, 1,1,1-trimethylolethane, 1,1,1-trimethylolpropane, glycerol, pentaerythritol, sugar alcohols such as, in particular, xylitol, sorbitol or mannitol, or sugars such as, in particular, sucrose, or alkoxylated derivatives of the alcohols mentioned or mixtures of the alcohols mentioned.

The polyurethane polymer containing isocyanate groups preferably has an average molecular weight in the range from 1'500 to 20'000 g/mol, especially 2'000 to 15'000 g/mol.

It is preferably liquid at room temperature.

The composition preferably comprises at least one polyurethane polymer containing isocyanate groups as described above.

In addition to a polyurethane polymer containing isocyanate groups, the composition may further comprise at least one diisocyanate and/or an oligomer or polymer of a diisocyanate, especially a room temperature liquid form of MDI or PMDI or an IPDI isocyanurate or TDI oligomer or a mixed isocyanurate based on TDI/HDI or an HDI oligomer.

The composition preferably comprises, as well as at least one polyisocyanate and/or at least one polyurethane polymer containing isocyanate groups and at least one latent hardener having aldimino group(s) of the formula (I), additionally at least one plasticizer.

Suitable plasticizers are especially carboxylic esters such as phthalates, especially diisononyl phthalate (DINP), diisodecyl phthalate (DIDP) or di(2-propylheptyl) phthalate (DPHP), hydrogenated phthalates, especially hydrogenated diisononyl phthalate (DINCH), terephthalates, especially dioctyl terephthalate, trimellitates, adipates, especially dioctyl adipate, azelates, sebacates, benzoates, glycol ethers, glycol esters, organic phosphoric or sulfonic esters, polybutenes, polyisobutenes, or plasticizers derived from natural fats or oils, especially epoxidized soybean oil or linseed oil. If the composition comprises at least one plasticizer, the content of plasticizers in the composition is preferably in the range from 1% to 35% by weight.

Preferably, the composition additionally comprises one or more further constituents which are especially selected from the group consisting of catalysts, fillers and solvents.

Suitable catalysts are especially catalysts for the hydrolysis of the aldimino groups, especially organic acids, especially carboxylic acids such as 2-ethylhexanoic acid, lauric acid, stearic acid, isostearic acid, oleic acid, neodecanoic acid, benzoic acid, salicylic acid or 2-nitrobenzoic acid, organic carboxylic anhydrides such as phthalic anhydride, hexahydrophthalic anhydride or methylhexahydrophthalic anhydride, silyl esters of carboxylic acids, organic sulfonic acids such as methanesulfonic acid, p-toluenesulfonic acid or 4-dodecylbenzenesulfonic acid, sulfonic esters, other organic or inorganic acids, or mixtures of the aforementioned acids and acid esters. Particular preference is given to carboxylic acids, especially aromatic carboxylic acids such as benzoic acid, 2-nitrobenzoic acid or especially salicylic acid.

Suitable catalysts are additionally catalysts for the acceleration of the reaction of isocyanate groups, especially organotin(IV) compounds such as, in particular, dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, complexes of bismuth(III) or zirconium(IV), especially with ligands selected from alkoxides, carboxylates, 1,3-diketonates, oxinate, 1,3-ketoesterates and 1,3-ketoamidates, or compounds containing tertiary amino groups, such as, in particular, 2,2'-dimorpholinodiethyl ether (DMDEE).

Also especially suitable are combinations of different catalysts.

Suitable fillers are especially ground or precipitated calcium carbonates, optionally coated with fatty acids, especially stearates, or barytes, quartz flours, quartz sands, dolomites, wollastonites, kaolins, calcined kaolins, sheet silicates such as mica or talc, zeolites, aluminum hydroxides, magnesium hydroxides, silicas including finely divided silicas from pyrolysis processes, cements, gypsums, fly ashes, industrially produced carbon blacks, graphite, metal powders, for example of aluminum, copper, iron, silver or steel, PVC powders or hollow beads.

Suitable solvents are especially acetone, methyl ethyl ketone, methyl n-propyl ketone, diisobutyl ketone, methyl isobutyl ketone, methyl n-amyl ketone, methyl isoamyl ketone, acetylacetone, mesityl oxide, cyclohexanone, methylcyclohexanone, ethyl acetate, propyl acetate, butyl acetate, n-butyl propionate, diethyl malonate, 1-methoxy-2-propyl acetate, ethyl 3-ethoxypropionate, diisopropyl ether, diethyl ether, dibutyl ether, diethylene glycol diethyl ether, ethylene glycol diethyl ether, ethylene glycol monopropyl ether, ethylene glycol mono-2-ethylhexyl ether, toluene, xylene, heptane, octane, naphtha, white spirit, petroleum ether or benzine, especially Solvesso™ products (from Exxon), and also methylene chloride, propylene carbonate, butyrolactone, N-methylpyrrolidone or N-ethylpyrrolidone.

The composition may comprise further additives commonly used for polyurethane compositions. More particularly, the following auxiliaries and additives may be present:
  inorganic or organic pigments, especially titanium dioxide, chromium oxides or iron oxides;
  fibers, especially glass fibers, carbon fibers, metal fibers, ceramic fibers, polymer fibers such as polyamide fibers or polyethylene fibers, or natural fibers such as wool, cellulose, hemp or sisal;
  dyes;
  desiccants, especially molecular sieve powder, calcium oxide, highly reactive isocyanates such as p-tosyl isocyanate, monomeric diisocyanates, monooxazolidines such as Incozol® 2 (from Incorez) or orthoformic esters;
  adhesion promoters, especially organoalkoxysilanes, especially epoxysilanes such as, in particular, 3-glycidoxypropyltrimethoxysilane or 3-glycidoxypropyltriethoxysilane, (meth)acrylosilanes, anhydridosilanes, carbamatosilanes, alkylsilanes or iminosilanes, or oligomeric forms of these silanes, or titanates;
  latent hardeners or crosslinkers, especially ketimines, enamines, oxazolidines or aldimines having aldimino groups not conforming to the formula (I);
  rheology modifiers, especially thickeners, especially sheet silicates such as bentonites, derivatives of castor oil, hydrogenated castor oil, polyamides, polyamide waxes, polyurethanes, urea compounds, fumed silicas, cellulose ethers or hydrophobically modified polyoxyethylenes;
  natural resins, fats or oils such as rosin, shellac, linseed oil, castor oil or soya oil;
  nonreactive polymers, especially homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene-vinyl acetate copolymers (EVA) or atactic poly-α-olefins (APAO);

flame-retardant substances, especially the aluminum hydroxide or magnesium hydroxide fillers already mentioned, and also, in particular, organic phosphoric esters such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris (2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenyl phosphate), bisphenol A bis (diphenyl phosphate) or ammonium polyphosphates;

additives, especially wetting agents, leveling agents, defoamers, deaerators, stabilizers against oxidation, heat, light or UV radiation, or biocides;

or further substances customarily used in moisture-curing compositions.

It may be advisable to chemically or physically dry certain substances before mixing them into the composition.

In the composition, the ratio between aldimino groups and isocyanate groups is preferably in the range from 0.05 to 1.1, more preferably 0.1 to 1.0, especially 0.2 to 0.9.

The composition preferably contains a content of polyisocyanates and of polyurethane polymers containing isocyanate groups in the range from 5% to 90% by weight, especially 10% to 80% by weight.

The composition is especially produced with exclusion of moisture and stored at ambient temperature in a moisture-tight container. A suitable moisture-tight container especially consists of an optionally coated metal and/or plastic, and is especially a vat, a container, a hobbock, a bucket, a canister, a can, a bag, a tubular bag, a cartridge or a tube.

The composition may take the form of a one-component or of a multi-component, especially two-component, composition.

A composition referred to as a "one-component" composition is one in which all constituents of the composition are in the same container and which is storage-stable per se.

A composition referred to as a "two-component" composition is one in which the constituents of the composition are in two different components which are stored in separate containers and are not mixed with one another until shortly before or during the application of the composition.

The composition is preferably a one-component composition. Given suitable packaging and storage, it is storage-stable, typically over several months up to one year or longer.

On application of the composition, the process of curing commences. This results in the cured composition.

In the case of a one-component composition, it is applied as such and then begins to cure under the influence of moisture or water. For acceleration of the curing, an accelerator component which contains or releases water and/or a catalyst can be mixed into the composition on application, or the composition can be contacted with such an accelerator component after application thereof. In the case of a two-component composition, it is applied after the mixing of the two components and begins to cure by internal reaction, and the curing may be completed by the action of external moisture. The two components can be mixed continuously or batchwise with dynamic mixers or static mixers.

In the curing, the isocyanate groups react under the influence of moisture with the aldimino groups of the polyaldimine of the formula (I) and any further blocked amino groups present. Some of the isocyanate groups, especially the excess isocyanate groups relative to the aldimino groups, react with one another under the influence of moisture and or with any further reactive groups present in the composition, especially hydroxyl groups or free amino groups. The totality of these reactions of isocyanate groups that lead to curing of the composition is also referred to as crosslinking.

The moisture required for curing of a one-component composition preferably gets into the composition through diffusion from the air (air humidity). This forms a solid layer of cured composition on the surfaces of the composition that are in contact with air ("skin"). The curing continues in the direction of diffusion from the outside inward, the skin becoming increasingly thick and ultimately encompassing the entire composition applied. The moisture can also get into the composition additionally or entirely from one or more substrate(s) to which the composition has been applied and/or can come from an accelerator component which is mixed into the composition on application or is contacted therewith after application, for example by painting or spraying. Any external humidity required to complete the curing of a two-component composition preferably comes from the air or from the substrates.

The composition is preferably applied at ambient temperature, especially in the range from about 0 to 50° C., preferably in the range from 5 to 40° C.

The composition is preferably likewise cured at ambient temperature.

The composition has a comparatively long open time.

The "open time" refers to the period of time over which the composition can be worked or reworked after the curing process has commenced.

The time until formation of a skin ("skin time") or until freedom from tack ("tack-free time") is a measure of the open time.

The crosslinking releases an aldehyde of the formula (VI). It is substantially nonvolatile and odorless and remains for the most part in the cured composition. It behaves or acts like a plasticizer therein. As such, it can in principle itself migrate and/or affect the migration of plasticizers. The aldehyde of the formula (VI) has very good compatibility with the cured composition, barely migrates itself, and also does not trigger any enhanced migration of plasticizers.

The composition is used as elastic adhesive, sealant or coating for at least one substrate and/or at least one outer layer that are sensitive to plasticizer migration.

Such uses are in the construction and industrial sectors.

Preferred uses in the industrial sector are assembly bonds and weld seals which are applied to stress crack-forming plastics or overpainted or overbonded.

Preferred uses in the construction sector are sealants for the elastic sealing of joins where one or both flanks of the join consist of porous materials, or which are overpainted, for example for the grouting of interspaces and cavities in civil engineering below ground, for example in roads, runways, open spaces or bridges, or in civil engineering above ground, for example in facades, bathrooms or kitchens.

Further preferred applications in the construction sector are elastic adhesives for wood or parquet.

Further preferred applications in the construction sector are elastic waterproofing coatings on roofs or balconies or crack-bridging coatings for parking garages or bridges.

The composition can be formulated such that it has a pasty consistency with structurally viscous properties. A composition of this kind is applied by means of a suitable device, for example from standard commercial cartridges or vats or hobbocks, for example in the form of a bead, which may have an essentially round or triangular cross-sectional area.

The composition can also be formulated such that it is fluid and "self-leveling" or only slightly thixotropic and can be poured out for application. As a coating, it can subsequently be distributed, for example, over an area down to the desired layer thickness, for example by means of a roller, a slide bar, a notched trowel or a palette knife. In one operation, typically a layer thickness in the range from 0.5 to 3 mm, especially 1.0 to 2.5 mm, is applied.

Suitable substrates which can be bonded or sealed or coated with the composition are especially glass, glass ceramic, concrete, mortar, fiber cement, especially fiber cement boards, brick, tile, gypsum, especially gypsum boards, or natural stone such as granite or marble;

repair or leveling compounds based on PCC (polymer-modified cement mortar) or ECC (epoxy resin-modified cement mortar);

metals or alloys, such as aluminum, copper, iron, steel, nonferrous metals, including surface-finished metals, or alloys such as galvanized or chromed metals;

asphalt or bitumen;

leather, textiles, paper, wood, woodbase materials bonded with resins such as phenolic, melamine or epoxy resins, resin-textile composites or further polymer composites;

plastics such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;

fiber-reinforced plastics, such as carbon fiber-reinforced plastics (CFP), glass fiber-reinforced plastics (GFP) and sheet molding compounds (SMC);

insulation foams, especially made of EPS, XPS, PUR, PIR, rockwool, glass wool or foamed glass;

coated or painted substrates, especially painted tiles, coated concrete, powder-coated metals or alloys or painted metal sheets;

paints or varnishes, especially automotive topcoats.

If required, the substrates can be pretreated prior to application, especially by chemical and/or physical cleaning methods or the application of an activator or a primer.

It is possible to bond and/or seal two identical or two different substrates.

In this case, either at least one substrate is sensitive to plasticizer migration or the composition after application is in contact with at least one outer layer sensitive to plasticizer migration.

The invention further provides a bonding composite or sealing composite or coating composite obtained from the use of the invention, comprising the optionally cured composition as described above, and
the substrate sensitive to plasticizer migration that adheres to the composition and/or the outer layer sensitive to plasticizer migration that adheres to the composition, as described above.

Preferably, the composite is an elastic seal and comprises either a substrate sensitive to plasticizer migration,
the cured composition adhering thereon,
optionally a further substrate adhering to the composition, and
optionally an outer layer adhering to the composition, which is especially a coat of paint, a varnish, a coating, a sealing layer or a protective film;

or a substrate,
the cured composition adhering thereon,
an outer layer adhering to the composition, which is especially a coat of paint, a varnish, a coating, a sealing layer or a protective film, and
optionally a further substrate adhering to the composition.

In the case of sealing between two substrates, the two substrates may each consist of the same material or of different materials.

In such a sealing composite, the thickness of the layer of cured composition is typically in the range from 0.5 to 70 mm, especially 2 to 50 mm.

The thickness of the outer layer in the form of a coat of paint or a varnish is typically in the range from 0.03 to 2 mm, especially 0.05 to 1 mm.

The thickness of the outer layer in the form of a coating is typically in the range from 1 to 10 mm, especially 1.5 to 5 mm.

The thickness of the outer layer in the form of a sealing layer is typically in the range from 1 to 50 mm, especially 2 to 30 mm.

The thickness of the outer layer in the form of a protective film is typically in the range from 0.01 to 3 mm, especially 0.05 to 1.5 mm.

Such a composite in the form of an elastic seal may be, for example, a sealed join, for example a dilatation joint between concrete elements, a floor join between marble sheets or a join between two components on a ship's deck made of wood. The composition adheres here to one or two porous substrates sensitive to plasticizer migration. In the example of the floor join between marble sheets, plasticizer migration gives rise to dark-colored, spotty strips alongside the join flanks which significantly impair the visual appearance of the costly floor and are virtually impossible to remove by cleaning.

Such a composite in the form of an elastic seal may also, for example, be an overpainted weld seal, for example in the bodywork region of vehicles, or a join overpainted with a coat of paint, for example in a built structure. Plasticizer migration can damage the (coat of) paint to such a degree that curing thereof is disrupted or there is subsequent occurrence of softening, swelling or tackiness. It is possible here for even a slight change in the outer layer to lead to problems, since overpainting often covers not just the sealant but also a greater area, for example a whole bodywork component or a greater area of the facade. When plasticizer migration causes a slight visual alteration in color, gloss or degree of soiling in the region directly above the sealant, slight alterations in color or gloss of the outer layer will also become apparent as unsightly strips or shadows.

Such a composite in the form of an elastic seal may also, for example, be a weld seal in the bodywork region of vehicles, covered with a protective film. Such a protective film may serve, for example, to prevent soiling of the component prior to painting and is to be removable in a simple manner prior to painting. In the event of plasticizer migration, it can be the case that the protective film in the region of the welded seam has been altered to such a degree that it can no longer be detached therefrom as desired.

Such a composite in the form of an elastic seal may also, for example, be a sealed join where the sealant has been applied in two layers with two different materials. Such a two-layer join occurs, for example, in the grouting of deep gaps between water-impervious substrates, wherein a water-containing component is mixed into the composition on application for reliable curing in the deep layer and the upper region of the join is filled with a second sealant which has particularly good surface properties but is unsuitable for the mixing-in of an aqueous component. The good surface properties of the upper sealant here shall not be disrupted by plasticizer migration from the lower sealant in the form of the cured composition.

Further preferably, the composite is an elastic bond and comprises either a)
- a first substrate sensitive to plasticizer migration,
- the cured composition adhering thereon, and
- a second substrate adhering to the composition;

or b)
- a first substrate,
- the cured composition adhering thereon,
- a second substrate adhering to the composition, and
- an outer layer adhering to the composition, which is especially a coat of paint, a varnish, a coating or a sealing layer and/or bonding layer;

or c)
- a first substrate,
- the cured composition adhering thereon,
- an outer layer adhering to the composition, which is especially a bonding layer, and
- a second substrate bonded to the outer layer.

The two substrates in the bonding composite may each consist of the same material or of different materials. They often consist of different materials.

What is meant by the term "sealing and/or bonding layer" is that the layer can fulfill both a sealing function and a bonding function.

The thickness of the layer of cured composition in such a bonding composite is typically in the range from 0.5 to 50 mm, especially 1 to 35 mm.

The thickness of the outer layer in the form of a coat of paint or a varnish is typically in the range from 0.03 to 2 mm, especially 0.05 to 1 mm.

The thickness of the outer layer in the form of a coating is typically in the range from 1 to 10 mm, especially 1.5 to 5 mm.

The thickness of the outer layer in the form of the sealing and/or bonding layer or of the bonding layer is typically in the range from 1 to 50 mm, especially 2 to 30 mm.

A bonding composite corresponding to case a) is, for example, an adhesive bond of wood or cardboard to a second substrate, wherein plasticizer migration can give rise to specks in the substrates, or an adhesive bond of a plastic sensitive to stress cracking to a second substrate, wherein plasticizer migration even in the event of small stresses in the region of the adhesive can cause stress cracks in the plastic which impair the function and visual appearance of the adhesive bond.

A bonding composite corresponding to case b) is, for example, an overpainted adhesive bond between two substrates, wherein the paint in the event of plasticizer migration can be damaged in the manner already described, or an adhesive bond between two or three substrates in which a joint filled with a sealant and/or adhesive is present between two substrates, wherein said sealant and/or adhesive is different than the cured composition and constitutes the outer layer. Such a situation exists, for example, in the adhesive mounting of panels with an elastic adhesive to a wall or to a frame, wherein the joins between the panels are only partly filled with the elastic adhesive and these joins are grouted with a further sealant and/or adhesive, for example one which is less elastic but particularly wash-resistant, wherein the two materials adhere to one another. In the event of plasticizer migration, the upper sealing and/or adhesive layer can be damaged to such an extent as to impair its function, especially its visual appearance or its wash resistance.

A bonding composite corresponding to case c) arises, for example, in the case of repair of an elastically bonded windshield, wherein the defective shield is cut out and a portion of the cured old adhesive remains. The new shield is bonded to this old cured adhesive with a fresh adhesive. In the event of plasticizer migration between the two adhesives, weakening of the adhesive bond can arise.

Further preferably, the composite is an elastic coating and comprises
- a substrate,
- the cured composition adhering thereon, and
- an outer layer adhering to the composition, which is especially a coat of paint, a varnish or a coating.

The thickness of the layer of cured composition in such a coating composite is typically in the range from 1 to 10 mm, preferably 1.5 to 7 mm, especially 2 to 6 mm, and may have been applied in one or more operations.

The thickness of the outer layer in the form of a coat of paint or a varnish is typically in the range from 0.03 to 2 mm, especially 0.05 to 1 mm.

The thickness of the outer layer in the form of a coating is typically in the range from 1 to 10 mm, especially 1.5 to 5 mm.

Such a coating composite is, for example, a crack-bridging floor covering, for example in a parking garage or on a bridge, or a sealing membrane applied in liquid form on a roof or a balcony, each of which is overcoated with a top coat, seal, coat of paint or varnish, wherein plasticizer migration can damage the outer layer in the manner described.

EXAMPLES

Adduced hereinafter are working examples which are intended to elucidate the invention described in detail. It will be appreciated that the invention is not restricted to these described working examples.

Aldehydes Used:

Aldehyde-1: Fractionated reaction mixture obtained from formylation, catalyzed by means of HF—BF$_3$, of C$_{10-14}$-alkylbenzene, containing mainly branched 4-(C$_{10-14}$-alkyl) benzaldehydes. (mean aldehyde equivalent weight 290 g/eq)

2,2-Dimethyl-3-lauroyloxypropanal (284.4 g/mol)
Benzaldehyde (106.1 g/mol)
p-tert-Butylbenzaldehyde (162.2 g/mol)
3-Phenoxybenzaldehyde (198.2 g/mol)

Aldehyde-1 is a mixture of aldehydes of the formula (VI), whereas 2,2-dimethyl-3-lauroyloxypropanal, benzaldehyde, p-tert-butylbenzaldehyde and 3-phenoxybenzaldehyde do not conform to the formula (VI).

Preparation of Aldimines:

The amine value (including aldimino groups) was determined by means of titration (with 0.1 N HClO$_4$ in acetic acid versus crystal violet).

The viscosity was measured with a thermostated Rheotec RC30 cone-plate viscometer (cone diameter 50 mm, cone angle 1°, cone tip-plate distance 0.05 mm, shear rate 10 s$^{-1}$).

Aldimine A1:

50.00 g of aldehyde-1 were initially charged in a round-bottom flask under a nitrogen atmosphere. While stirring, 13.93 g of 3-aminomethyl-3,5,5-trimethylcyclohexylamine were added and then the volatile constituents were removed at 80° C. and a reduced pressure at 10 mbar. A light yellow, odorless and pH-neutral liquid having a viscosity at 20° C. of 21.3 Pa·s and an amine value of 150.1 mg KOH/g was obtained.

Aldimine A2:

50.00 g of aldehyde-1 were initially charged in a round-bottom flask under a nitrogen atmosphere. While stirring, 13.58 g of hexane-1,6-diamine solution (70% by weight in water) were added and then the volatile constituents were removed at 80° C. and a reduced pressure of 10 mbar. A light yellow, odorless and pH-neutral liquid having a viscosity at 20° C. of
1.0 Pa·s and an amine value of 161.6 mg KOH/g was obtained.

Aldimine A3:

50.00 g of aldehyde-1 were initially charged in a round-bottom flask under a nitrogen atmosphere. While stirring, 11.14 g of 1,3-bis(aminomethyl)benzene were added and then the volatile constituents were removed at 80° C. and a reduced pressure at 10 mbar. A pale yellow, odorless and pH-neutral liquid having a viscosity at 20° C. of 2.6 Pa·s and an amine value of 155.7 mg KOH/g was obtained.

Aldimine A4:

50.00 g of aldehyde-1 were initially charged in a round-bottom flask under a nitrogen atmosphere. While stirring, 11.63 g of 1,3-bis(aminomethyl)cyclohexane were added and then the volatile constituents were removed at 80° C. and a reduced pressure at 10 mbar. A light yellow, odorless and pH-neutral liquid having a viscosity at 20° C. of 6.1 Pa·s and an amine value of
153.0 mg KOH/g was obtained.

Aldimine A5:

50.00 g of aldehyde-1 were initially charged in a round-bottom flask under a nitrogen atmosphere. While stirring, 17.21 g of 4,4'-diaminodicyclohexylmethane were added and then the volatile constituents were removed at 80° C. and a reduced pressure at 10 mbar. A light yellow, odorless and pH-neutral liquid having a viscosity at 20° C. of 59.6 Pa s and an amine value of 140.2 mg KOH/g was obtained.

Aldimine A6:

50.00 g of aldehyde-1 were initially charged in a round-bottom flask under a nitrogen atmosphere. While stirring, 8.85 g of 1,4-phenylenediamine were added and then the volatile constituents were removed at 80° C. and a reduced pressure at 10 mbar. An orange-brown, odorous and pH-neutral liquid having a viscosity at 20° C. of 4.9 Pa·s and an amine value of 163.0 mg KOH/g was obtained.

Aldimine A7:

25.00 g of aldehyde-1 were initially charged in a round-bottom flask under a nitrogen atmosphere. While stirring, 8.60 g of 2-(2-aminoethoxy)ethanol were added and then the volatile constituents were removed at 80° C. and a reduced pressure at 10 mbar. A pale yellow, odorous and pH-neutral liquid having a viscosity at 20° C. of 0.4 Pa·s and an amine value of 142.9 mg KOH/g was obtained.

Aldimine A8:

25.00 g of aldehyde-1 were initially charged in a round-bottom flask under a nitrogen atmosphere. While stirring, 14.02 g of 3-aminomethyl-3,5,5-trimethylcyclohexanol were added and then the volatile constituents were removed at 80° C. and a reduced pressure at 10 mbar. A pale yellow, odorless and pH-neutral liquid having a viscosity at 20° C. of 34.3 Pa·s and an amine value of 122.3 mg KOH/g was obtained.

Aldimine R1:

50.00 g of 2,2-dimethyl-3-lauroyloxypropanal were initially charged in a round-bottom flask under a nitrogen atmosphere. While stirring, 13.93 g of 3-aminomethyl-3,5,5-trimethylcyclohexylamine were added and then the volatile constituents were removed at 80° C. and a reduced pressure at 10 mbar. A pale yellow, odorless liquid having an amine value of 153.0 mg KOH/g was obtained.

Aldimine R2:

50.00 g of 2,2-dimethyl-3-lauroyloxypropanal were initially charged in a round-bottom flask under a nitrogen atmosphere. While stirring, 13.88 g of hexane-1,6-diamine solution (70% by weight in water) were added and then the volatile constituents were removed at 80° C. and a reduced pressure at 10 mbar. An almost colorless, odorless liquid having an amine value of 165.0 mg KOH/g was obtained.

Aldimine R3:

50.00 g of 2,2-dimethyl-3-lauroyloxypropanal were initially charged in a round-bottom flask under a nitrogen atmosphere. While stirring, 11.39 g of 1,3-bis(aminomethyl)benzene were added and then the volatile constituents were removed at 80° C. and a reduced pressure at 10 mbar. An almost colorless, odorless liquid having an amine value of 160.9 mg KOH/g was obtained.

Aldimine R4:

50.00 g of 2,2-dimethyl-3-lauroyloxypropanal were initially charged in a round-bottom flask under a nitrogen atmosphere. While stirring, 9.05 g of 1,4-phenylenediamine were added and then the volatile constituents were removed at 80° C. and a reduced pressure at 10 mbar. A light brown, odorless liquid having an amine value of 167.6 mg KOH/g was obtained.

Aldimine R5:

24.46 g of 2,2-dimethyl-3-lauroyloxypropanal were initially charged in a round-bottom flask under a nitrogen atmosphere. While stirring, 8.60 g of 2-(2-aminoethoxy)ethanol were added and then the volatile constituents were removed at 80° C. and a reduced pressure at 10 mbar. An almost colorless, odorless liquid having an amine value of 144.3 mg KOH/g was obtained.

Aldimine R6:

33.43 g of benzaldehyde were initially charged in a round-bottom flask under a nitrogen atmosphere. While stirring, 25.55 g of IPDA were added and then the volatile constituents were removed at 80° C. and a reduced pressure at 10 mbar. What was obtained was a light yellow, intensely odorous liquid having an amine value of 314.1 mg KOH/g, which crystallized after a few days.

Aldimine R7:

27.87 g of p-tert-butylbenzaldehyde were initially charged in a round-bottom flask under a nitrogen atmosphere. While stirring, 13.93 g of IPDA were added and then the volatile constituents were removed at 80° C. and a reduced pressure at 10 mbar. What was obtained was a light yellow, intensely odorous, highly viscous liquid having an amine value of 236.2 mg KOH/g, which crystallized after a few days. The viscosity at 80° C. was 23.7 Pas.

Aldimine R8:

34.06 g of 3-phenoxybenzaldehyde were initially charged in a round-bottom flask under a nitrogen atmosphere. While stirring, 13.93 g of IPDA were added and then the volatile constituents were removed at 80° C. and a reduced pressure at 10 mbar. What was obtained was a light yellow, highly viscous liquid with low odor and having an amine value of 203.8 mg KOH/g, which crystallized after a few days. The viscosity at 80° C. was 5.1 Pas.

The aldimines A1 to A6 are polyaldimines of the formula (III); the aldimines R1 to R4 and R6 to R8 serve as a comparison.

The aldimines A7 and A8 are aldimines of the formula (IV); the aldimine R5 serves as a comparison.

Preparation of Polymers Containing Isocyanate Groups

Polymer P1:

300.0 g of polyoxypropylenepolyoxyethylenediol (Desmophen® L300, from Covestro; OH number 190.0 mg KOH/g) and 228.8 g of isophorone diisocyanate (Vestanat® IPDI, Degussa) were reacted by a known method at 60° C. to give an NCO-terminated polyurethane polymer which is liquid at room temperature and has a content of free isocyanate groups of 8.35% by weight.

Polymer P2:

590 g of polyoxypropylenediol (Acclaim® 4200, from Covestro; OH number 28.5 mg KOH/g), 1180 g of polyoxypropylenepolyoxyethylenetriol (Caradol® MD34-02, from Shell; OH number 35.0 mg KOH/g) and 230 g of isophorone diisocyanate (Vestanat® IPDI, Degussa) were reacted by a known method at 80° C. to give an NCO-terminated polyurethane polymer which is liquid at room temperature and has a content of free isocyanate groups of 2.10% by weight.

Polymer P3:

3080 g of polyoxypropylenediol (Acclaim® 4200, from Covestro; OH number 28.5 mg KOH/g), 1540 g of polyoxypropylenepolyoxyethylenetriol (Caradol® MD34-02, from Shell; OH number 35.0 mg KOH/g) and 385 g of tolylene diisocyanate (Desmodur® T 80 P, Covestro) were reacted at 80° C. by a known method to give an NCO-terminated polyurethane polymer which is liquid at room temperature and has a content of free isocyanate groups of 1.50% by weight.

Polymer P4:

4000 g of polyoxypropylenediol (Acclaim® 4200, from Covestro; OH number 28.5 mg KOH/g) and 520 g of diphenylmethane 4,4'-diisocyanate (Desmodur® 44 MC L, from Covestro) were reacted by a known method at 80° C. to give an NCO-terminated polyurethane polymer which is liquid at room temperature and has a content of free isocyanate groups of 1.85% by weight.

Preparation of Reaction Products:

Reaction Product U1:

60.00 g (about 115.3 mmol of NCO) of polymer P1, 15.82 g (about 40.4 mmol) of aldimine A7 and 0.05 g of Coscat® 83 were mixed in a honey jar under argon and then left to react in an air circulation oven at 60° C. for 16 hours. A clear reaction product which is liquid at room temperature and has aldimine and isocyanate groups was obtained.

Reaction Product U2:

60.00 g (about 115.3 mmol of NCO) of polymer P1, 18.51 g (about 40.4 mmol) of aldimine A8 and 0.05 g of Coscat® 83 were mixed in a honey jar under argon and then left to react in an air circulation oven at 60° C. for 16 hours. A clear reaction product which is liquid at room temperature and has aldimine and isocyanate groups was obtained.

Reaction Product Q1:

60.00 g (about 115.3 mmol of NCO) of polymer P1, 15.69 g (about 40.4 mmol) of aldimine R5 and 0.05 g of Coscat® 83 were mixed in a honey jar under argon and then left to react in an air circulation oven at 60° C. for 16 hours. A clear reaction product which is liquid at room temperature and has aldimine and isocyanate groups was obtained.

The reaction products U1 and U2 are reaction products having aldimino group(s) of the formula (V) which also contain unconverted polymer P1. The reaction product Q1 serves as a comparison.

One-Component Compositions

Compositions Z1 to Z6 and Ref1 to Ref5

For each composition, the ingredients specified in tables 1 and 2 were mixed in the amounts specified (in parts by weight) by means of a centrifugal mixer (SpeedMixer™ DAC 150, FlackTek Inc.) with exclusion of moisture at 3000 rpm for one minute and stored with exclusion of moisture. Each composition was tested as follows:

As a measure of plasticizer migration, speck formation was determined on cardboard. For this purpose, each composition was applied to a piece of cardboard such that it had a round base area of diameter 12 mm and a height of 20 mm, and was stored under standard climatic conditions for 7 days. Around each composition, thereafter, a dark oval speck had formed on the cardboard. The dimensions thereof (height and width) were measured and reported in table 1 as Migration.

Compositions Z1 to Z6 are inventive examples. Compositions Ref1 to Ref5 are comparative examples.

Compositions Z1 to Z6 are suitable as elastic adhesives, sealants or especially coatings.

TABLE 1

Composition (in parts by weight) and properties of Z1 to Z4 and Ref1 to Ref4.

| Composition | | Z1 | Ref1 | Z2 | Ref2 | Z3 | Ref3 | Z4 | Ref4 |
|---|---|---|---|---|---|---|---|---|---|
| Polymer P1 | | 15.00 | 15.00 | 15.00 | 15.00 | 15.00 | 15.00 | 15.00 | 15.00 |
| Chalk[1] | | 15.00 | 15.00 | 15.00 | 15.00 | 15.00 | 15.00 | 15.00 | 15.00 |
| Silica[2] | | 1.13 | 1.13 | 1.13 | 1.13 | 1.13 | 1.13 | 1.13 | 1.13 |
| Aldimine | | A1 | R1 | A2 | R2 | A3 | R3 | A6 | R4 |
| | | 7.80 | 7.65 | 7.25 | 7.10 | 7.41 | 7.28 | 7.13 | 6.97 |
| Dibutyltin dilaurate solution[3] | | 1.50 | 1.50 | 1.50 | 1.50 | 1.50 | 1.50 | 1.50 | 1.50 |
| Salicylic acid solution[4] | | 3.00 | 3.00 | 3.00 | 3.00 | 3.00 | 3.00 | 3.00 | 3.00 |
| Migration [mm] | Height | 80 | 110 | 45 | 130 | 110 | 120 | 65 | 135 |
| | Width | 55 | 85 | 40 | 90 | 85 | 95 | 50 | 95 |

[1]ground calcium carbonate coated with fatty acid
[2]hydrophobically modified fumed silica
[3]5% in diisodecyl phthalate
[4]5% in dioctyl adipate

TABLE 2

Composition (in parts by weight) and properties of Z5 and Z6 and Ref5.

| | Composition | | |
|---|---|---|---|
| | Z5 | Z6 | Ref5 |
| Reaction product | U1 | U2 | Q1 |
| | 25.0 | 25.0 | 25.0 |
| Chalk[1] | 25.0 | 25.0 | 25.0 |
| Silica[2] | 1.9 | 1.9 | 1.9 |
| Dibutyltin dilaurate solution[3] | 2.5 | 2.5 | 2.5 |
| Salicylic acid solution[4] | 5.0 | 5.0 | 5.0 |
| Migration [mm] Height | 1 | 1 | 8 |
| Width | 1 | 1 | 6 |

[1]ground calcium carbonate coated with fatty acid
[2]hydrophobically modified fumed silica
[3]5% in diisodecyl phthalate
[4]5% in dioctyl adipate Compositions Z7 to Z20 and Ref6 to Ref12

For each composition, the ingredients specified in tables 3 to 5 were mixed in the amounts specified (in parts by weight) by means of a centrifugal mixer (SpeedMixer™ DAC 150, FlackTek Inc.) with exclusion of moisture at 3000 rpm for one minute and stored with exclusion of moisture. Each composition was tested as follows:

As a measure of storage stability, the Viscosity (1d RT) was determined the day after production, and the Viscosity (7d 60° C.) after storage in a closed container in an air circulation oven at 60° C. for 7 days. The viscosity was measured, at a temperature of 20° C. in each case, with a thermostated Rheotec RC30 cone-plate viscometer (cone diameter 50 mm, cone angle 1°, cone tip-plate distance 0.05 mm, shear rate 10 s$^{-1}$).

As a measure of the open time, the Tack-free time was determined. For this purpose, a few grams of the composition were applied to cardboard in a layer thickness of about 2 mm and, under standard climatic conditions, the time until, when the surface of the composition was gently tapped by means of an LDPE pipette, there were for the first time no residues remaining any longer on the pipette was determined.

To determine the mechanical properties, each composition was poured onto a PTFE-coated film to give a film of thickness 2 mm and stored under standard climatic conditions for 7 days, and a few dumbbells having a length of 75 mm with a bar length of 30 mm and a bar width of 4 mm were punched out of the film and these were tested in accordance with DIN EN 53504 at a strain rate of 200 mm/minute for Tensile strength (breaking force), Elongation at break, Modulus of elasticity 5% (at 0.5-5% elongation) and Modulus of elasticity 50% (at 0.5-50% elongation).

Appearance was assessed visually on the films produced. "Nice" was used to describe a clear, nontacky film without blisters.

To determine Plasticizer migration, a composite was produced from each composition by pouring the composition out on a glass plate to give a film of thickness 2 mm, covering the surface with a strip of polyethylene film of width 20 mm, and storing this composite under standard climatic conditions for 14 days. Subsequently, the polyethylene film was pulled away from the surface of the cured composition and examined for soiling in the form of traces of escaped liquid. If no such traces were present, plasticizer migration was answered "no", otherwise "yes".

Odor was assessed by smelling by nose at a distance of 2 cm from the freshly produced films. "No" means that no odor was perceptible.

The results are reported in tables 3 to 5.

Compositions Z7 to Z20 are inventive examples. Compositions Ref6 to Ref12 are comparative examples.

Compositions Z7 to Z11 are especially suitable as elastic coating, compositions Z12 to Z16 are especially suitable as elastic sealant, and compositions Z17 to Z20 are especially suitable as elastic adhesive.

TABLE 3

Composition (in parts by weight) and properties of Z7 to Z11 and Ref6.

| Composition | Z7 | Z8 | Z9 | Z10 | Z11 | Ref6 |
|---|---|---|---|---|---|---|
| Polymer P2 | 80.00 | 80.00 | 80.00 | 80.00 | 80.00 | 80.00 |
| Aldimine | A1 | A2 | A3 | A4 | A6 | R1 |
|  | 10.47 | 9.72 | 9.95 | 10.04 | 9.57 | 10.27 |
| Salicylic acid solution[1] | 1.50 | 1.50 | 1.50 | 1.50 | 1.50 | 1.50 |
| Viscosity (1 d RT) [Pa · s] | 15.2 | 15.5 | 18.7 | 18.3 | 15.9 | 13.6 |
| (7 d 60° C.) | 17.5 | 21.1 | 28.1 | 23.1 | 18.6 | 16.2 |
| Tack-free time | 3 h | 1 h 40' | 1 h 05' | 1 h 10' | >8 h | 2 h |
| Tensile strength [MPa] | 1.42 | 0.95 | 1.01 | 1.21 | 1.07 | 0.98 |
| Elongation at break [%] | 240 | 219 | 259 | 271 | 215 | 142 |
| Modulus of elasticity 5% [MPa] | 1.72 | 0.90 | 0.95 | 1.15 | 1.23 | 1.50 |
| Modulus of elasticity 50% | 0.82 | 0.62 | 0.57 | 0.67 | 0.72 | 0.90 |
| Appearance | nice | nice | nice | nice | nice | nice |
| Plasticizer migration | no | no | no | no | no | yes |
| Odor | no | no | no | no | no | no |

[1]5% in dioctyl adipate

TABLE 4

Composition (in parts by weight) and properties of Z12 to Z16 and Ref7.

| Composition | Z12 | Z13 | Z14 | Z15 | Z16 | Ref7 |
|---|---|---|---|---|---|---|
| Polymer P3 | 80.00 | 80.00 | 80.00 | 80.00 | 80.00 | 80.00 |
| Aldimine | A1 | A2 | A3 | A4 | A6 | R2 |
|  | 7.53 | 7.00 | 7.17 | 7.23 | 6.89 | 6.85 |
| Salicylic acid solution[1] | 1.50 | 1.50 | 1.50 | 1.50 | 1.50 | 0.20 |
| Viscosity (1 d RT) [Pa · s] | 16.3 | 19.4 | 27.6 | 25.5 | 23.7 | 27.2 |
| (7 d 60° C.) | 20.6 | 28.0 | 45.3 | 35.8 | 30.0 | 47.3 |
| Tack-free time | 1 h 35' | 45' | 40' | 46' | 2 h 35' | 38' |
| Tensile strength [MPa] | 0.52 | 1.22 | 1.72 | 0.94 | 1.79 | 0.73 |
| Elongation at break [%] | 297 | 373 | 346 | 281 | 241 | 210 |
| Modulus of elasticity 5% [MPa] | 0.41 | 1.68 | 3.54 | 1.06 | 4.60 | 1.06 |

TABLE 4-continued

Composition (in parts by weight) and properties of Z12 to Z16 and Ref7.

| Composition | Z12 | Z13 | Z14 | Z15 | Z16 | Ref7 |
|---|---|---|---|---|---|---|
| Modulus of elasticity 50% | 0.21 | 0.74 | 1.07 | 0.57 | 1.42 | 0.59 |
| Appearance | nice | nice | nice | nice | nice | nice |
| Plasticizer migration | no | no | no | no | no | yes |
| Odor | no | no | no | no | no | no |

[1]5% in dioctyl adipate

TABLE 5

Composition (in parts by weight) and properties of Z17 to Z20 and Ref8 and Ref12.

| Composition | Z17 | Z18 | Z19 | Z20 | Ref8 | Ref9 | Ref10 | Ref11 | Ref12 |
|---|---|---|---|---|---|---|---|---|---|
| Polymer P4 | 80.00 | 80.00 | 80.00 | 80.00 | 80.00 | 80.00 | 80.00 | 80.00 | 80.00 |
| Aldimine | A1 | A2 | A5 | A6 | R1 | R4 | R6 | R7 | R8 |
|  | 9.20 | 8.56 | 9.67 | 8.42 | 9.03 | 8.24 | 4.40 | 5.85 | 6.78 |
| Salicylic acid solution[1] | 1.50 | 1.50 | 1.50 | 1.50 | 1.50 | 1.50 | 1.50 | 1.50 | 1.50 |
| Viscosity (1 d RT) [Pa·s] | 29.4 | 50.0 | 32.0 | 35.7 | 22.1 | 24.7 | 36.5 | 43.8 | 39.9 |
| (7 d 60° C.) | 34.8 | 87.2 | 37.5 | 27.0 | 31.6 | 41.1 | 47.4 | 44.6 |  |
| Tack-free time | 1 h 20' | 1 h 10' | 1 h 10' | 1 h 30' | 45' | 45' | 1 h 30' | 2 h | 1 h 35' |
| Tensile strength [MPa] | 1.62 | 2.91 | 3.46 | 2.10 | 1.18 | 4.86 | 1.66 | 1.44 | 0.55 |
| Elongation at break [%] | 1240 | 508 | 803 | 248 | 1240 | 784 | 936 | 1674 | 1098 |
| Modulus of elasticity 5% [MPa] | 0.75 | 5.66 | 1.27 | 10.30 | 1.02 | 10.9 | 1.00 | 0.79 | 0.41 |
| Modulus of elasticity 50% | 0.41 | 1.82 | 0.75 | 1.81 | 0.54 | 2.44 | 0.51 | 0.40 | 0.17 |
| Appearance | nice | nice | nice | nice | nice | nice | nice | nice | nice |
| Plasticizer migration | no | no | no | no | yes | yes | no | no | no |
| Odor | no | no | no | no | no | no | significant | significant | slight |

[1]5% in dioctyl adipate

Compositions Z21 and Ref13 to Ref17

These compositions were produced in the same way as described for composition Z1 using the figures in table 6.

As a measure of plasticizer migration, each composition was applied to a cardboard underlayer such that it had a round base area of diameter 15 mm and a height of 4 mm, and was stored under standard climatic conditions for 3 months. A dark oval speck formed around each composition on the cardboard, the dimensions of which (height and width) were measured after 7 days and after 3 months under standard climatic conditions and were reported in table 6 as Migration (7d) or (3 months).

As a measure of the tendency to Stress-cracking on plastic, each composition was applied to a transparent, prestressed plastic sheet of polycarbonate (Makrolon®) having the dimensions of 150×30×2 mm so as to give rise to a coating of 30×30×2 mm in the middle of the stressed sheet. After 24 h under standard climatic conditions, the coating or the composition was removed and the sheet was examined for cracking and other visual changes. The prestressed plastic sheet was fixed in each case over a round piece of timber of diameter 12.5 mm mounted on a board such that the long side was at right angles to the round piece of timber and the narrow ends were fixed on the board. "Low" is used to describe the formation of small, slightly visible cracks of length 2 to 3 mm in the edge region of the sheet, which were present only superficially. "Significant" is used to describe a complete crack across the entire width of the sheet which was visible across the entire thickness of the sheet. In addition, very many small cracks were present here in the edge region of the sheet.

Odor was assessed by smelling by nose at a distance of 2 cm from the freshly produced test specimens.

Composition Z21 is an inventive example. Compositions Ref13 to Ref17 are comparative examples.

TABLE 6

Composition (in parts by weight) and properties of Z21 and Ref13 to Ref17

| Composition | Ref13 | Ref14 | Ref15 | Ref16 | Ref17 | Z21 |
|---|---|---|---|---|---|---|
| Polymer P1 | 15.00 | 15.00 | 15.00 | 15.00 | 15.00 | 15.00 |
| Chalk | 15.00 | 15.00 | 15.00 | 15.00 | 15.00 | 15.00 |
| Silica | 1.13 | 1.13 | 1.13 | 1.13 | 1.13 | 1.13 |
| Aldimine | — | R1 | R6 | R7 | R8 | A1 |
|  |  | 5.46 | 2.66 | 3.54 | 4.11 | 5.57 |
| Dibutyltin dilaurate solution[1] | 1.50 | 1.50 | 1.50 | 1.50 | 1.50 | 1.50 |
| Salicylic acid solution[2] | 3.00 | 3.00 | 3.00 | 3.00 | 3.00 | 3.00 |
| Migration Height | 17 | 37 | 17 | 16 | 17 | 18 |

TABLE 6-continued

Composition (in parts by weight) and properties of Z21 and Ref13 to Ref17

| Composition | | Ref13 | Ref14 | Ref15 | Ref16 | Ref17 | Z21 |
|---|---|---|---|---|---|---|---|
| (7 d) [mm] | Width | 17 | 41 | 19 | 16 | 19 | 19 |
| Migration | Height | 25 | 47 | 28 | 20 | 20 | 23 |
| (3 months) [mm] | Width | 25 | 52 | 28 | 22 | 21 | 23 |
| Stress cracking | | low | significant | low | low | low | low |
| Odor | | none | none | significant | significant | slight | none |

[1]5% in diisodecyl phthalate
[2]5% in dioctyl adipate

It is clear from the migration results in table 6 that the inventive composition Z21 comprising aldimine A1 has a similar to even lower tendency to plasticizer migration than the composition Ref13 without aldimine, and is at a similar level to compositions Ref15 to Ref17 with more or less odorous aldimines derived from benzaldehyde, p-tert-butylbenzaldehyde or 3-phenoxybenzaldehyde. By contrast, composition Ref14 comprising aldimine R1, which likewise contains a long-chain substituent and has a similarly high molecular weight to aldimine A1, has significant plasticizer migration.

Compositions Z22 and Ref18

For each composition, 100 parts by weight of SikaBone-T40 (one-component solvent-free elastic polyurethane adhesive containing 0.61% by weight of isocyanate groups and 20.75% by weight of plasticizer; from Sika) and the further ingredients specified in table 7 were mixed in the amount specified (in parts by weight) by means of the centrifugal mixer with exclusion of moisture at 3000 rpm for one minute and stored. Each composition was tested as follows: To measure the tensile shear strength (TSS), various test specimens were produced, with application of the composition between two isopropanol-degreased sheets of polycarbonate (Makrolon®) in a layer thickness of 3.2 mm and over an overlapping bonding area of 30×20 mm. The test specimens were stored/cured under standard climatic conditions for 14 days and then the tensile shear strength was determined to DIN EN 1465 at a strain rate of 10 mm/min and reported as "TSS on polycarbonate".

To measure migration on granite, two granite cuboids of dimensions 25×12×75 mm were used to produce a join having a cross section of 12×12 mm and a length of 50 mm between two such cuboids as described in DIN EN ISO 8339. Every test specimen of this kind was stored/cured under standard climatic conditions for 14 days. Subsequently, each join was compressed by 25% by means of suitable clamps (joint width compressed from 12 to 9 mm) and the join thus compressed was stored under standard climatic conditions for 14 days. Subsequently, each cuboid was assessed visually for discoloration in the granite resulting from migrated plasticizer. The average distance of the dark strip in the granite from the flanks of the join was reported as "Migration (granite)".

Tensile Strength, Elongation at Break and Stress at 100% Elongation were
measured using the previously compressed test specimens, with determination of the values in accordance with DIN EN ISO 8339 under standard climatic conditions at a strain rate of 5 mm/min.

The results are reported in table 7.

Composition Z22 is an inventive example. Composition Ref18 is a comparative example.

TABLE 7

Composition (in parts by weight) and properties of Z22 and Ref18.

| | Composition | |
|---|---|---|
| | Z22 | Ref18 |
| SikaBond ®-T40 | 100.0 | 100.0 |
| Aldimine A1 | 2.2 | — |
| Aldimine R1 | — | 2.1 |
| Salicylic acid solution[1] | 1.2 | 0.3 |
| Dioctyl adipate | — | 0.9 |
| TSS on polycarbonate [MPa] | 0.18 | 0.12 |
| Migration (granite) [mm] | 1 mm | 2 mm |
| Tensile strength [MPa] | 0.29 | 0.19 |
| Elongation at break | 415% | 433% |
| Stress at 100% elongation [MPa] | 0.21 | 0.14 |

[1]5% in dioctyl adipate

The invention claimed is:

1. A method comprising applying a composition as an elastic adhesive, sealant, or coating to at least one substrate that is configured to be sensitive to plasticizer migration and/or at least one outer layer that is configured to be sensitive to plasticizer migration, the composition comprising
   at least one polyisocyanate and/or at least one polyurethane polymer containing isocyanate groups and
   at least one latent hardener having aldimino group(s) of the formula (I)

(I)

where Z is a radical of the formula (II)

(II)

where R is a branched alkyl radical having 10 to 14 carbon atoms.

2. The method as claimed in claim 1, wherein the at least one substrate is a porous material or a stress crack-forming plastic.

3. The method as claimed in claim 1, wherein the at least one outer layer is or cures to form a polymeric material.

4. The method as claimed in claim 3, wherein the at least one outer layer is a sealing layer or an adhesive layer or a coating or a protective film.

5. The method as claimed in claim 1, wherein the at least one latent hardener having aldimino group(s) of the formula (I) is a polyaldimine of the formula (III)

(III)

where
n is 2 or 3 and
A is an n-valent hydrocarbyl radical optionally containing ether oxygen and having a molecular weight in a range of from 28 to 6'000 g/mol.

6. The method as claimed in claim 5, wherein A has an average molecular weight in a range of from 170 to 470 g/mol.

7. The method as claimed in claim 1, wherein the at least one latent hardener having aldimino group(s) of the formula (I) is a reaction product having aldimino group(s) of the formula (V)

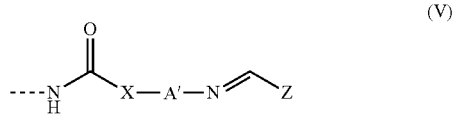

(V)

where
A' is a divalent aliphatic or cycloaliphatic or arylaliphatic hydrocarbyl radical optionally containing ether oxygen or amine nitrogen and having a molecular weight in a range of from 28 to 500 g/mol, and
X is O or S or $NR^O$ where $R^O$ is a hydrogen radical or is a hydrocarbyl radical which has 1 to 30 carbon atoms and optionally contains at least one carboxylic ester, nitrile, nitro, phosphonic ester, sulfone or sulfonic ester group or aldimino group of the formula (I).

8. The method as claimed in claim 1, wherein the composition comprises a mixture including two or more latent hardeners having aldimino group(s) of the formula (I) in which each latent hardener has a Z that is a radical of the formula (II) and an R that is selected from linear or branched decyl, undecyl, dodecyl, tridecyl, and tetradecyl radicals.

9. The method as claimed in claim 1, wherein the composition comprises the at least one polyurethane polymer containing isocyanate groups.

10. The method as claimed in claim 9, wherein the composition further comprises a catalyst.

11. The method as claimed in claim 1, wherein the composition further comprises at least one plasticizer.

12. The method as claimed in claim 1, wherein the composition is a one-component composition.

13. A bonding composite or sealing composite or coating composite obtained from the method as claimed in claim 1, comprising
the optionally cured composition and
the substrate adhering to the composition and/or the outer layer adhering to the composition.

14. The composite as claimed in claim 13, wherein it is an elastic seal and comprises
either
a substrate sensitive to plasticizer migration,
the cured composition adhering thereon,
optionally a further substrate adhering to the composition, and
optionally an outer layer adhering to the composition;
or
a substrate,
the cured composition adhering thereon,
an outer layer adhering to the composition, and
optionally a further substrate adhering to the composition.

15. The composite as claimed in claim 13, wherein it is an elastic adhesive bond and comprises
either a)
a first substrate sensitive to plasticizer migration,
the cured composition adhering thereon, and
a second substrate adhering to the composition;
or b)
a first substrate,
the cured composition adhering thereon,
a second substrate adhering to the composition, and
an outer layer adhering to the composition;
or c)
a first substrate,
the cured composition adhering thereon,
an outer layer adhering to the composition, and
a second substrate bonded to the outer layer.

16. The composite as claimed in claim 13, wherein it is an elastic coating and comprises
a substrate,
the cured composition adhering thereon, and
an outer layer adhering to the composition.

17. The method as claimed in claim 2, wherein the porous material is selected from the group consisting of wood, paper, cardboard, gypsum, mortar, fiber cement, concrete, and natural stone.

18. The method as claimed in claim 17, wherein the natural stone is marble, granite, gneiss, limestone, or sandstone.

* * * * *